US012771881B2

(12) United States Patent
Yin et al.

(10) Patent No.: US 12,771,881 B2
(45) Date of Patent: Oct. 20, 2026

(54) MESSAGING PARAMETERS FOR NEURAL-NETWORK POST FILTERING IN IMAGE AND VIDEO CODING

(71) Applicant: DOLBY LABORATORIES LICENSING CORPORATION

(72) Inventors: Peng Yin, Ithaca, NY (US); Arjun Arora, Sunnyvale, CA (US); Tong Shao, Sunnyvale, CA (US); Taoran Lu, Santa Clara, CA (US); Fangjun Pu, Sunnyvale, CA (US); Sean Thomas McCarthy, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 18/851,620

(22) PCT Filed: Apr. 3, 2023

(86) PCT No.: PCT/US2023/017252
§ 371 (c)(1),
(2) Date: Sep. 26, 2024

(87) PCT Pub. No.: WO2023/196217
PCT Pub. Date: Oct. 12, 2023

(65) Prior Publication Data

US 2025/0211799 A1 Jun. 26, 2025

Related U.S. Application Data

(60) Provisional application No. 63/354,549, filed on Jun. 22, 2022, provisional application No. 63/328,131, filed on Apr. 6, 2022.

(51) Int. Cl.
*H04N 19/85* (2014.01)
*H04N 19/172* (2014.01)
(Continued)

(52) U.S. Cl.
CPC .......... *H04N 19/85* (2014.11); *H04N 19/172* (2014.11); *H04N 19/186* (2014.11); *H04N 19/70* (2014.11)

(58) Field of Classification Search
None
See application file for complete search history.

(56) References Cited

U.S. PATENT DOCUMENTS

2020/0387713 A1 12/2020 Kanthan
2021/0329306 A1 10/2021 Liu
(Continued)

FOREIGN PATENT DOCUMENTS

RU 2684478 C1 4/2019
WO 2021045905 A1 3/2021
WO 2021050268 A1 3/2021

OTHER PUBLICATIONS

Choi et al., "AHG9/AHG11: SEI messages for carriage of neural network information for postfiltering," Joint Video Experts Team (JVET) of ITU-T SG 16 WP 3 and ISO/IEC JTC 1/SC 29, 22nd Meeting, by teleconference, Apr. 20-28, 2021, Document: JVET-V0091-v2, p. 1-15 (Year: 2021).*
(Continued)

*Primary Examiner* — Stuart D Bennett

(57) ABSTRACT

Methods, systems, and bitstream syntax are described for the carriage of neural network topology and parameters as related to neural-network-based post filtering (NNPF) in image and video coding. Examples of NNPF SEI messaging as applicable to the MPEG standards for coding video pictures are described at the sequence layer and at the picture layer.

17 Claims, 6 Drawing Sheets

(51) Int. Cl.
*H04N 19/186* (2014.01)
*H04N 19/70* (2014.01)

(56) References Cited

U.S. PATENT DOCUMENTS

2022/0329837 A1* 10/2022 Li ........................ H04N 19/436
2024/0283978 A1 8/2024 Yin

OTHER PUBLICATIONS

"White Paper on Neural Network Coding," MPEG document N00057, ISO/IEC JTC 1/SC 29/AG 03, Jan. 2022., pp. 1-6.
Advanced Video Coding, Rec. ITU-T H.264, Jun. 2019, pp. 1-836.
Choi et al., "AHG9/ AHG11: SEI messages for carriage of neural network information for postfiltering," Joint Video Experts Team (JVET) of ITU-T SG 16 WP 3 and ISO/IEC JTC 1/SC 29, 22nd Meeting, by teleconference, Apr. 20-28, 2021, Document: JVET-V0091-v2, pp. 1-15.
Choi et al., "Cleanups on HLS of NNR," ISO/IEC JTC 1/SC 29/WG 4 MPEG Video Coding, ISO/IEC JTC 1/SC 29/WG 4 m55205, Oct. 2020, Online, pp. 1-4.
H. Kirchhoffer et al., "Overview of the Neural Network Compression and Representation (NNR) Standard," IEEE Transactions on Circuits and Systems for Video Technology, doi: 10.1109/TCSVT.2021.3095970, pp. 1-14.
High Efficiency Video Coding, Rec. ITU-T H.265, Nov. 2019, pp. 1-712.
K. Takada et al., "AHG9: Complexity description for NNR post-filter SEI message," Joint Video Experts Team (JVET) of ITU-T SG 16 WP 3 and ISO/IEC JTC 1/SC 29 25th Meeting, by teleconference, Jan. 12-21, 2022, Document: JVET-Y0075-v3, pp. 1-4.
Li et al., "AHG11: Deep In-Loop Filter with Adaptive Model Selection and External Attention," Joint Video Experts Team (JVET) of ITU-T SG 16 WP 3 and ISO/IEC JTC 1/SC 29 23rd Meeting, by teleconference, Jul. 7-16, 2021, Document: JVET-W0100-v1, pp. 1-5.
Li et al., "EE1-1.6: Combined Test of EE1-1.2 and EE1-1.4," Joint Video Experts Team (JVET) of ITU-T SG 16 WP 3 and ISO/IEC JTC 1/SC 29 24th Meeting, by teleconference, Oct. 6-15, 2021, Document: JVET-X0066-v1, pp. 1-5.
Li et al., "AHGI11 Conditional In-Loop Filter with Parameter Selection," Joint Video Experts Team (JVET) of ITU-T SG 16 WP 3 and ISO/IEC JTC 1/SC 29 22nd Meeting, by teleconference, Apr. 20-28, 2021, Document: JVET-V0101-v2, pp. 1-5.
M. M. Hannuksela et al., "AHG9: On post-filter SEI", Joint Video Experts Team (JVET) of ITU-T SG 16 WP 3 and ISO/IEC JTC 1/SC 29 22nd Meeting, by teleconference, Apr. 20-28, 2021, Document: JVET-V0058, pp. 1-4.
M. M. Hannuksela et al., "AHG9: On post-filter SEI," Joint Video Experts Team (JVET) of ITU-T SG 16 WP 3 and ISO/IEC JTC 1/SC 29 24th Meeting, by teleconference, Oct. 6-15, 2021, Document: JVET-X0112-v1, pp. 1-5.
M. M. Hannuksela et al., "AHG9: On post-filter SEI," Joint Video Experts Team (JVET) of ITU-T SG 16 WP 3 and ISO/IEC JTC 1/SC 29 25th Meeting, by teleconference, Jan. 12-21, 2022, Document: JVET-Y0115-v1, pp. 1-7.
M. M. Hannuksela et al., "AHG9: NN post-filter SEI," Joint Video Experts Team (JVET) of ITU-T SG 16 WP 3 and ISO/IEC JTC 1/SC 29 26th Meeting, by teleconference, Apr. 20-29, 2022, Document: JVET-Z0244-v1, pp. 1-17.
Mccarthy et al., "Additional SEI messages for VSEI (Draft 1),"of ITU-T SG 16 WP 3 and ISO/IEC JTC 1/SC 29 26th Meeting, by teleconference, Apr. 20-29, 2022, Document: JVET-Z2006-v1, pp. 1-16.
Mccarthy et al., "AHG9: Neural-network post filtering SEI message," Joint Video Experts Team (JVET) of ITU-T SG 16 WP 3 and ISO/IEC JTC 1/SC 29, 26th Meeting, by teleconference, Apr. 20-29, 2022, Document: JVET-Z0121-v2, pp. 1-11.
MPEG-7: Compression of Neural Networks for Multimedia Content Description and analysis: ISO/IEC 15938-17:2020 (E), ISO JTC 1/SC 29/WG 11, pp. 1-89.
Santamaria et al., "AHG11: MPEG NNR compressed bias update for the CNN based post-filter of EE1-1.1" Joint Video Experts Team (JVET) of ITU-T SG 16 WP 3 and ISO/IEC JTC 1/SC 29 24th Meeting, by teleconference, Oct. 6-15, 2021, Document: JVET-X0111, pp. 1-5.
Santamaria et al., "AHG11: Content-adaptive neural network post-processing filter," Joint Video Experts Team (JVET) of ITU-T SG 16 WP 3 and ISO/IEC JTC 1/SC 29, 23rd Meeting, by teleconference, Jul. 7-16, 2021, Document: JVET-W0057, pp. 1-9.
Shao et al., "AHG9: On auxiliary input and separate colour description in the neural-network post-filter characteristics SEI message," Joint Video Experts Team (JVET) of ITU-T SG 16 WP 3 and ISO/IEC JTC 1/SC 29, 27th Meeting, by teleconference, Jul. 13-22, 2022, Document: JVET-AA0100-v2, pp. 1-14.
Shao et al., "AHG9: On processing order in the neural-network post-filter activation SEI message," Joint Video Experts Team (JVET), of ITU-T SG 16 WP 3 and ISO/IEC JTC 1/SC 29 27th Meeting, by teleconference, Jul. 13-22, 2022, Document: JVET-AA0101-v1, pp. 1-4.
T. Chujoh et al., "AHG9: Colour component description for post-filter purpose SEI message," Joint Video Experts Team (JVET) of ITU-T SG 16 WP 3 and ISO/IEC JTC 1/SC 29 25th Meeting, by teleconference, Jan. 12-21, 2022, Document: JVET-Y0073-v1, pp. 1-4.
Versatile Video Coding, Rec. ITU-T H.266, Aug. 2020, pp. 1-516.
Wang et al., "EE1-1.1: neural network based in-loop filter with constrained storage and low complexity," Joint Video Experts Team (JVET) of ITU-T SG 16 WP 3 and ISO/IEC JTC 1/SC 29 25th Meeting, by teleconference, Jan. 12-21, 2022, Document: JVET-Y0078-v2, pp. 1-5.
Wang et al., "EE1-1.4: Tests on Neural Network-based In-Loop Filter with constrained computational complexity," Joint Video Experts Team (JVET) of ITU-T SG 16 WP 3 and ISO/IEC JTC 1/SC 29 24th Meeting, by teleconference, Oct. 6-15, 2021, Document: JVET-X0140-v1, pp. 1-5.
Y. Yasugi et al., "AHG9: Data conversion description for NNR post-filter SEI message," Joint Video Experts Team (JVET) of ITU-T SG 16 WP 3 and ISO/IEC JTC 1/SC 29 25th Meeting, by teleconference, Jan. 12-21, 2022, Document: JVET-Y0074-v1, pp. 1-6.

* cited by examiner

MESSAGING PARAMETERS FOR NEURAL-NETWORK POST FILTERING IN IMAGE AND VIDEO CODING

CROSS-REFERENCE TO RELATED APPLICATIONS

This application is a U.S. National Stage application under U.S.C. 371 of International Application No. PCT/US2023/017252, filed on Apr. 3, 2023 (reference: D22016WO01), which claims priority of U.S. Provisional Patent Application No. 63/328,131 filed Apr. 6, 2022 and U.S. Provisional Patent Application No. 63/354,549 filed Jun. 22, 2022, each of which is incorporated by reference in its entirety.

TECHNOLOGY

The present document relates generally to images and video coding. More particularly, an embodiment of the present invention relates to messaging information related to messaging parameters related to neural-networks post filtering in image and video coding.

BACKGROUND

In 2020, the MPEG group in the International Standardization Organization (ISO), jointly with the International Telecommunications Union (ITU), released the first version of the Versatile Video coding Standard (VVC), also known as H.266 (Ref. [3]). More recently, the same group has been working on the development of the next generation coding standard that provides improved coding performance over existing video coding technologies. As part of this investigation, coding techniques based on artificial intelligence and deep learning are also examined. As used herein the term "deep learning" refers to neural networks (NNs) having at least three layers, and preferably more than three layers.

Neural-networks post filtering (NNPF) and neural-networks loop filtering (NNLF) have been shown to improve coding efficiency in image and video coding. While MPEG-7, part 17 (ISO/IEC 15938-17) (Ref. [11]) describes a method for the compression of the representation of neural networks, it is rather inefficient under the bit rate constraints in image and video coding. As appreciated by the inventors here, improved techniques for the carriage of neural network topology and parameters as related to NNPF in image and video coding are desired, and they are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Example embodiments that relate to the carriage of neural network topology and parameters as related to NNPF in image and video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to the carriage of neural network topology and parameters as related to NNPF in image and video coding. In an embodiment, a processor receives a decoded image and NNPF metadata related to processing the decoded image with NNPF. The processor:

- parses syntax parameters in the NNPF metadata to perform NNPF according to one or more neural-network models, associated NNPF data, and NNPF parameters; and
- performs NNPF on the decoded image according to the syntax parameters to generate an output image, wherein the syntax parameters in the NNPF metadata comprise a first set of NNPF messaging parameters that persist until the end of decoding the coded video sequence and a second set of NNPF messaging parameters that persist until the end of NN post-filtering of the decoded image.

In another embodiment, a processor receives an image or a video sequence comprising pictures. The processor:

- encodes the image or the video sequence into a coded bitstream; and
- generates neural networks post filtering (NNPF) metadata to allow a decoder of the coded bitstream to perform NNPF according to one or more neural-network models, associated NNPF data, and NNPF parameters; and
- generates an output comprising the coded bitstream and the NNPF metadata, wherein the syntax parameters in the NNPF metadata comprise a first set of NNPF messaging parameters that persist until the end of decoding the coded video sequence and a second set of NNPF messaging parameters that persist until the end of NN post-filtering of a single decoded image.

Example Model for Neural-Network Post Filtering

Figure 1:
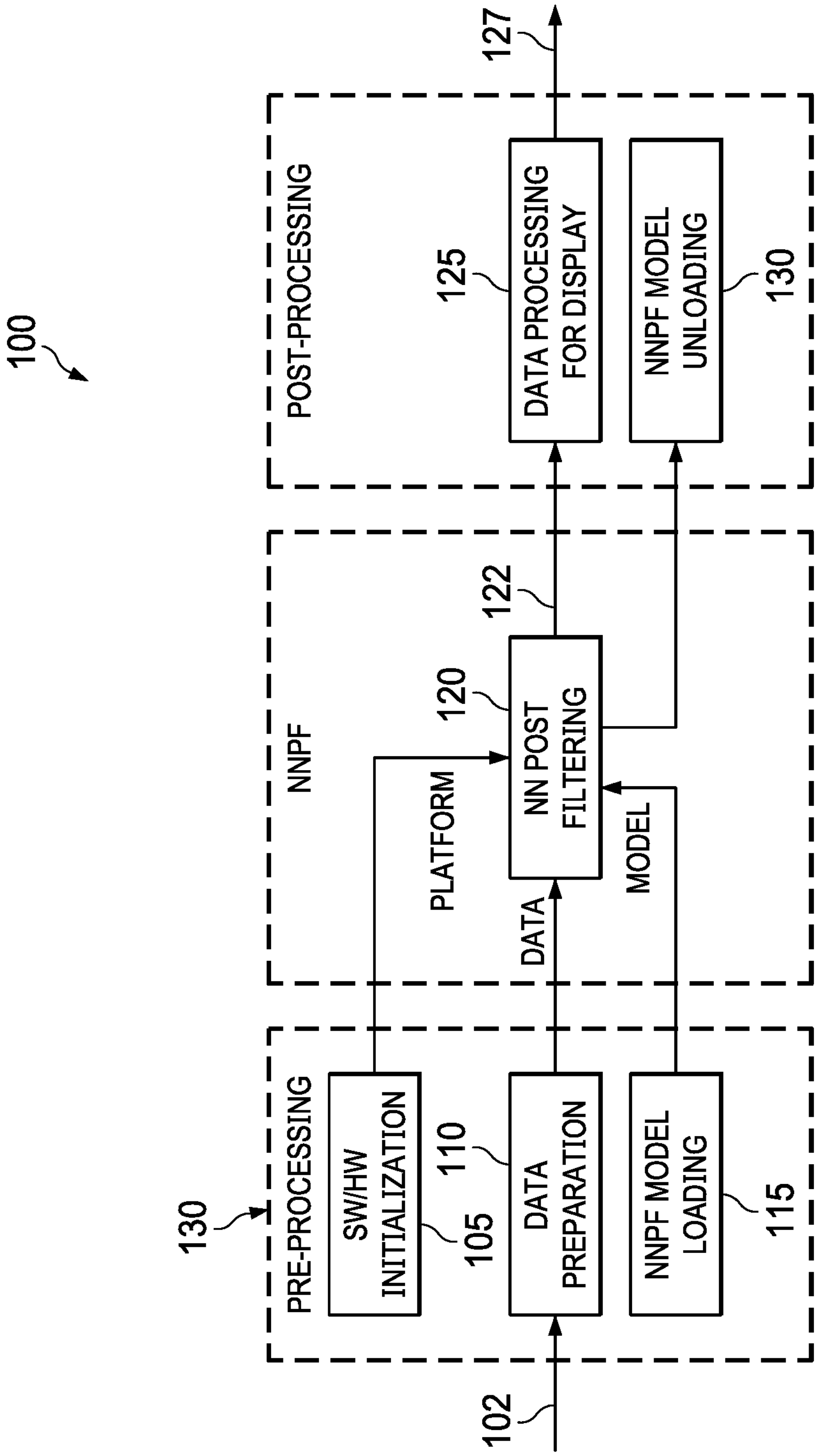
FIG. 1 depicts an example processing pipeline for neural network post filtering (NNPF) according to an embodiment of this invention.

FIG. 1 depicts an example process (100) for neural-network post filtering (NNPF) according to an embodiment.

Given decoded input 102, the NNPF pipeline includes pre-processing (130), the actual NNPF processing, and post-processing stages. The pre-processing stage (130) includes software/hardware initialization (105), data preparation (110) and NNPF model loading (115). The software/hardware initialization will configure the computing environment of the receiver, such as a graphical processing unit (GPU), and the specified software libraries, such as Tensorflow, PyTorch, and the like. A ready-to-use computing platform will be available after the initialization. The data preparation (110) will convert the decoded frames (102) to the format that can be directly processed by the corresponding NN model. For example, the decoded fames are usually partitioned into patches (rectangular image blocks), they are converted to the NN model's data input format, such as YUV444 and the like, and are organized into batches before input. Meanwhile, in step 115, specific models, based on picture types and other flags are selected and are loaded to be used. The above three procedures can be done in parallel. The NNPF stage (120) performs the actual NN post filtering operations (e.g., up-scaling, filtering, etc.) based on the specific model, data, and platform inputs from the preprocessing stage (130). Finally, in the post-processing stage, in step 125, the NNPF output (122) will be converted to a data format suitable for display as output 127, while in step 130, the NNPF model maybe be unloaded so the NNPF pipeline (100) is ready for other operations. Note that process 100 can be easily extended to other NN-based post-processing, such as super resolution and denoising.

Metadata signaling, e.g., via SEI messaging, for NNPF has been proposed in the past in several JVET meetings (Refs. [4-10]). The previous proposals focused more on how to signal NN topology and NN parameters either by carrying an NNR (Neural Network Compression and Representation) bitstream (Ref. [11-13]) or with an external link (Ref. [4]), such as a given Uniform Resource Identifier (URI), with syntax and semantics as specified in IETF Internet Standard 66. Some of the proposals also addressed issues related to the NN input or output interfaces and the NN complexity (Ref. [7-9]).

Despite using compression, an NNR bitstream may still be quite large, thus affecting bandwidth utilization. Furthermore, when using NNR, a decoder needs to comply to and be able to decode yet another standard. As appreciated by the inventors, NNPF metadata must be lightweight, but still provide the necessary information for a decoder to check if it can apply NNPF, and if it can, access the required parameters to perform NNPF processing (100) as described earlier.

While neural nets may be applied also to loop filtering and other application, embodiments described herein focus, without limitation, on NNPF due to two main reasons: 1) NNPF is decoupled from decompression, so the implementation can have more freedom and be used for any image or video codec. 2) It is out of the coding loop (which, typically includes transform processing, quantization, and loop filtering (deblocking)), so it does not require fixed-point implementation to avoid drift issues. Thus, a floating point implementation, generally used in NNs, can be applied.

Since the NNPF is performed out of the decoding loop, the NNPF does not have the potential drift issue of the NNLF (loop filter) processing. For NNLF, if there is a bad filtering result for one frame or one block, which is possible since the NN may not be robust enough for all frame data, this will result in the bad quality of the currently decoded frame, which may be used as the reference frame for the later ones. Therefore, the errors and artifacts can be accumulated and propagated to other frames as a drift phenomenon. In another example, most NNs are implemented using floating point, which can have different results on different machine/platform/operation systems. This can cause encoder and decoder mismatch for one frame and the error can cause drift issues for the following decoded frames if the mismatched frame is used as reference.

Two levels of NNPF-related messaging are proposed: 1) at the CLVS (Coded Layer Video Sequence) layer (where NNPF operations persist until the end of the video sequence), and 2) at the Picture layer (where NNPF operations persist only until the end of the current picture). This allows picture-wise NNPF messaging and filtering without repeating certain filter characteristics that apply to the whole video sequence. While the proposed messaging is described using notation and syntax commonly used to describe MPEG's SEI messaging (Ref. [1-3]), the proposed metadata messaging may be carried using a variety of other suitable messaging formats, for example, as used in AV1 and other proprietary or standards-based coding formats. The proposed messaging can also be applied to other MPEG-based standards, such as AVC and HEVC. The proposed SEI message helps NNPF utilize the coding characteristics by providing information that is not available for standalone post filters, thus further improving the post filter performance.

In example embodiments, the proposed CLVS NNPF SEI aims to provide information to assist in the efficient implementation of an NNPF pipeline, such as initialization, preprocessing, model loading/unloading and post-processing. The picture layer NNPF SEI aims to allow picture-level adaptation, to further improve NNPF coding efficiency.

CLVS-Layer NNPF SEI

The scope of CLVS-layer NNPF SEI is for the entire coded sequence. The purpose is to signal it with the first picture of the CLVS and should not be changed throughout a CLVS. It should be able to assist decoders to get ready to apply the NNPF to the decoded picture after bitstream decoding. More specifically, when an NNPF SEI message is present for any picture of a CLVS of a particular layer, the NNPF SEI message shall be present for the first picture of the CLVS. The NNPF SEI message persists for the current layer in decoding order from the current picture until the end of the CLVS. All NNPF SEI messages that apply to the same CLVS shall have the same content. In an example embodiment, CLVS NNPF SEI includes the following information.

1) Network Topology and Model Parameters

For an NNPF SEI message, it is desired to have the SEI message carry only the necessary information, so the size of the SEI message is not too big. Otherwise, an encoder can simply reduce the quantization (QP) value at the expense of higher bitrate and improve the quality of the coded sequence. The size of detailed network topology (for example, using a graph to describe the topology) and its corresponding parameter values (weights and biases, in the case of a convolutional neural network (CNN)), can be relatively big, for example in the range of kilo bytes, Megabytes or even Gigabytes. It is not realistic to carry all the information in the SEI bitstream. Compression can be applied to the models (such as NNR in Ref [11]), but still the size is not negligible. One way to signal the detailed NN model information is to use an explicit link or some external means, such as a cross-reference to URI (IETF Internet Standard 66) as discussed in Ref. [4]. Another way is to have a fixed model standardized 0—or an external reference link for a base model, and the bitstream only carries the incremental information (Ref. [14]), such as updated biases or weights, either for a full NN, or a small subset of the NN.

In addition to topology and model parameters, it is important to let the decoder know the following information too, so it can help a decoder achieve a fast initialization or quickly decide if it can implement the NNPF or bypass it.

NN storage/exchange format: the most popular ones now include ONNX, NNEF, PyTorch, and TensorFlow, but additional formats can be added as needed Complexity indication of the NNPF: computation and memory. The most often used indicators are: NN parameter precision value: floating point (FP64, FP32, or FP16) and integer (e.g., INT8); number of NN model parameters; the number of multiply- and accumulations (MACs) per pixel in units of a thousand (kMac/pixel) or a million (mMac/pixel), and the like, and floating point operations per second (FLOPS). It is noted that multiplying NN parameter precision and number of NN parameters can give the memory size of the model. Other parameters such as latency, throughput, power usage are also good indicators. The complexity indicator may assist a decoder to skip or bypass NNPF processing if there are not adequate computing resources.

Number of models: A NN model can be different based on a variety of parameters, such as the signal coded in the bitstream, the QP value, the slice/picture type, the content type, and the device type. For example, if a GBR (RGB) signal is directly coded, in general, a joint model is used. If a YUV signal is coded, one can have either a joint model (Ref. [16]) or a separate model for the Y and U/V components (Ref. [15]). The bitstream can contain different slice types, such as intra (I) and inter (P/B) slices. One can use the same model for every slice or different models for intra and inter slices (Refs [15-16, 18]). The sequence can be standard-dynamic range (SDR) or high dynamic range (HDR), nature content or screen-captured content (SCC), and the like, and each such variation may also require a different model. If the bitstream is decoded in a variety of displays, models may depend on display type (say, a TV or a mobile device) to address decoder computing capacity or the perceived visual quality on the display. The different quality issues may also require different models, such as a QP-varied model (Ref. [17]).

As an example, Table 1, depicts an example of syntax parameters for NNPF topology and model parameters information for a single model. The syntax includes an NN topology and parameters for an explicit link (if it exists) or updated parameters, NN storage and exchange format, and NN complexity indications. The multiple models should loop over this SEI. It is noted that multiple models most likely use the same storage and exchange format, so an alternative solution is to move this information out and only signal once in the core NNPF SEI message.

TABLE 1

Example of NNPF topology and model parameters

| | Descriptor |
|---|---|
| nnpf_topology_and_model_parameters_info(nnpf_model_id ) { | |
| nnpf_model_exter_link_flag /*signal if use external link*/ | u(1) |
| if( nnpf_model_exter_link_flag ){ | |
| i = 0 | |
| do | |
| nnpf_exter_uri[ i ] | b(8) |
| while( nnpf_exter_uri[ i++ ] != 0 ) | |
| } | |
| nnpf_model_upd_param_present_flag /*signal updated parameters if needed*/ | u(1) |
| if ( nnpf_model_upd_param_present_flag ) { | |
| /*refer to Ref.[4] for specific syntax*/ | |
| } | |
| nnpf_model_storage_form_idc /*signal NN storage and exchange format, ONNX, NNEF, Tensorflow, PyTorch, and reserved bits for future extentsion*/ | u(3) |
| nnpf_model_complexity_ind_present_flag /*signal NN complexity related parameters (Ref. [9])*/ | u(1) |
| if( nnpf_model_complexity_ind_present_flag ){ | |
| nnpf_param_prec_idc | u(4) |
| log2_nnpf_num_param_minus11 | ue(v) |
| nnpf_num_param_frac | ue(v) |
| log2_prec_denom | ue(v) |
| nnpf_num_op | ue(v) |
| nnpf_latency_idc | ue(v) |
| } | |
| } | |

nnpf_model_exter_link_flag equal to 1 indicates that the NNPF model is stored in an external link. nnpf_model_exter_link_flag equal to 0 indicates that the NNPF model is not stored in the external link.

nnpf_exter_uri[i] contains the i-th byte of a NULL-terminated UTF-8 character string that indicates a URI (IETF Internet Standard 66), which specifies the neural network to be used as the post-processing filter.

nnpf_model_upd_param_present_flag equal to 1 indicates that the model parameters are updated. nnpf_model_upd_param_present_flag equal to 0 indicates that the model parameters are not updated.

Note: See Ref. [4] for additional updated parameters syntax and semantics.

nnpf_model_storage_form_idc indicates the storage and exchange format for the NNPF model as specified in Table 2. The values 0 to 3 corresponds to ONNX, NNEF, Tensorflow and PyTorch respectively. Values 4 to 7 are reserved for future extensions.

TABLE 2

| Example of nnpf_model_storage_form_idc interpretation | |
|---|---|
| nnpf_model_storage_form_idc | storage and exchange format for NNPF |
| 0 | ONNX |
| 1 | NNEF |
| 2 | Tensorflow |
| 3 | PyTorch |
| 4 . . . 7 | Reserved |

nnpf_model_complexity_ind_present_flag equal to 1 indicates that the model complexity indicators are present in the SEI messages. If nnpf_model_complexity_ind_present_flag equal to 0, the model complexity indicators are not present in the SEI messages. The inferred value for all the following syntax should be 0 unless otherwise specified. "0" can be interpreted as "NULL" (which means do not exist) or "can be ignored" in this context.

nnpf_param_prec_idc indicates the NNPF model parameters precision as specified in Table 3. When not present, the syntax value of nnpf_param_prec_idc is inferred to be 5.

TABLE 3

| Example of nnpf_param prec_idc interpretation | |
|---|---|
| nnpf_param_prec_idc | NNPF model parameter precision value |
| 0 | int8 |
| 1 | int16 |
| 2 | int32 |
| 3 | float16 |
| 4 | float32 |
| 5 | float64 |
| 6 . . . 15 | Reserved |

Note:
for a number of parameters one may use the following method to represent them: c = 1.a * 2^b, where "a" represents a fractional portion of 1, and "b" (an integer) is the power of 2 (e.g., for a = 5 and b = 2, then c = 1.5*2^2 = 6).

nnpf_num_param_frac is the fractional number to represent the total number of model parameters log 2_prec_denorm is the base 2 logarithm of the denominator for the fractional number to represent the total number of model parameters.

log 2_nnpf_num_param_minus11 plus 11 is the base 2 logarithm to represent the total number of model parameters. The variable tot_num_params is derived as follows:

$$\text{tot\_num\_params} = (\text{int64})\,(1.0 + (\mathit{float}64)\,\text{nnpf\_num\_param\_frac} / (\mathit{float}64)\,(1 << (\text{log2\_prec\_denorm})) * (\mathit{float}64)\,(1 << (\text{log2\_nnpf\_num\_param\_minus11} + 11))$$

The NNPF model's total number of parameters should be no larger than the value of tot_num_params.

When the above three syntax elements are not present, the value of tot_num_params is inferred to be 0 for "NULL."

nnpf_num_ops times 1,000 specifies the maximum number of MAC (multiply-accumulate) operations per pixel for NNPF.

Note: the more precise definition of this parameter can use 1.a*2^b as the tot_num_params.

nnpf_latency_idc specifies the latency indication of the NNPF model as specified in Table 4. It indicates that with a baseline GPU (for example, defined as Nvidia RTX 1080Ti) available, the combination of resolution and frame rate that can be supported by the NNPF model to ensure the real-time decoding and no delay in consistence with the decoder.

TABLE 4

| Example of nnpf_latency_idc interpretation | |
|---|---|
| nnpf_latency_idc | resolution and frame rate supported by NNPF model |
| 0 | no requirement |
| 1 | 720 p, 30 fps |
| 2 | 720 p, 60 fps |
| 3 | 1080 p, 30 fps |
| 4 | 1080 p, 60 fps |
| 5 | 1080 p, 120 fps |
| 6 | 4k, 30 fps |
| 8 | 4k, 60 fps |
| 8 | 4k, 120 fps |
| 9 | 4k, 15 fps |
| 10-15 | reserved |

It is noted that the NN storage/exchange format or a complexity indication can be generated by downloading the model and using a standalone analyzer. Therefor a "present flag" such as nnpf_model_complexity_ind_present_flag is used to provide this option as a complexity indication.

2) Input and Output Chroma Format and Data Format

The data input to the NN might be different from the decoded format. To correctly apply NNPF, the following information may be included in the bitstream.

- The input and output data format
- Precision of the data
- The tensor format
- Input and output patch size, boundary overlapping indication and overlapping size, picture size and padding method. It is noted that in NN training, the input patch size is very important to ensure the model's generalization and robustness. Video frames can have a wide range of resolutions, thus, the scale of the objects, textures, and artifacts could be very different. Other than including various patch sizes in training one model, another efficient way is to use different models to handle difference patch sizes. The patch size is also one of the important factors to affect the training speed. Hence, to indicate the patch size in SEI is very important.

An example of SEI messaging data information is shown in Table 5.

TABLE 5

| Example of NNPF data information | |
|---|---|
| | Descriptor |
| nnpf_data_info( ) { | |
| input_chroma_format_idc /* descriptor of input chroma format in terms of number of channels and sampling rate. Follows sps_chroma_format_idc (H.266 | u(2) |

TABLE 5-continued

Example of NNPF data information

Figure 2:
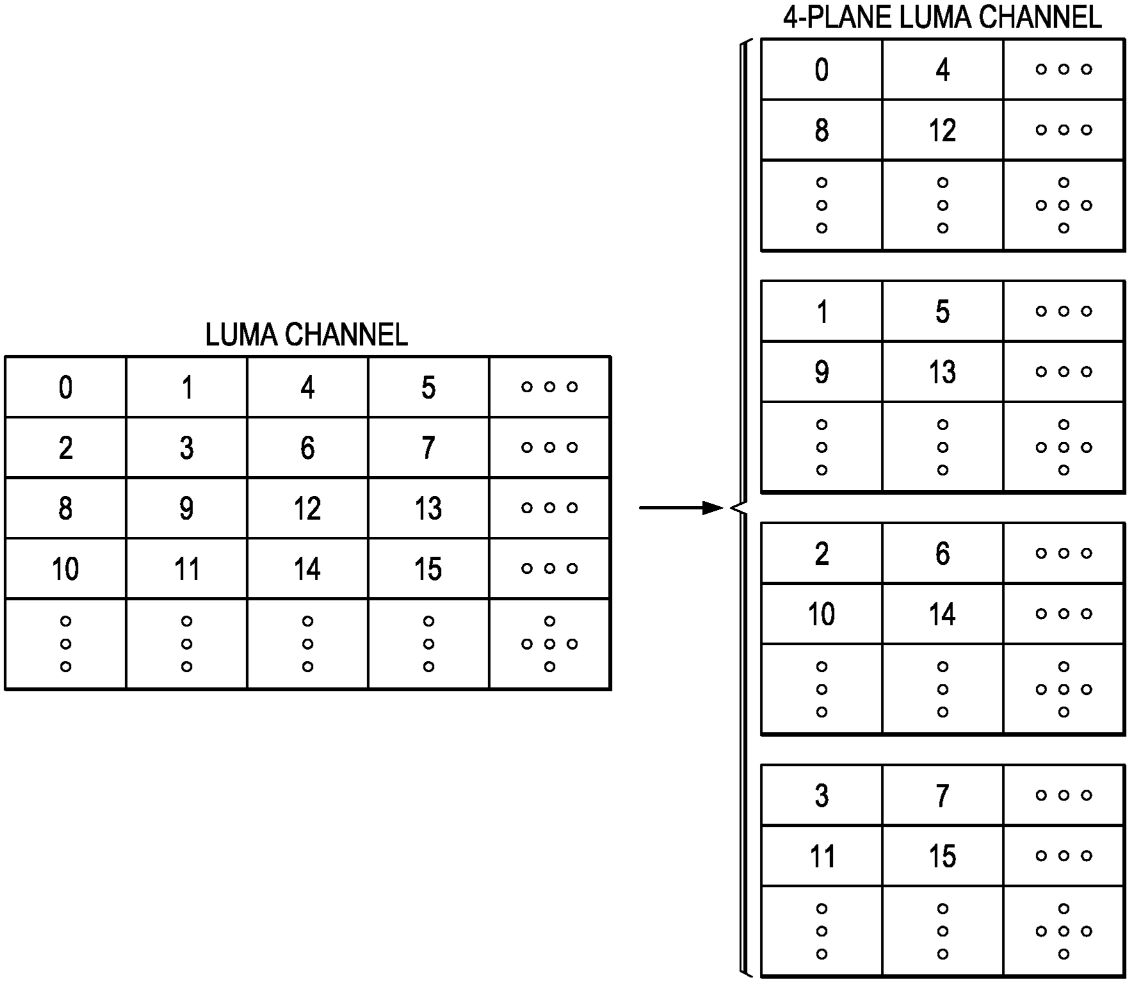
FIG. 2 depicts an example packing format for a luma channel in a YUV420 signal according to an embodiment of this invention.

| | Descriptor |
|---|---|
| Spec) */ | |
| output_chroma_format_idc /* descriptor of output chroma format in terms of number of channels and sampling rate. Follows sps_chroma_format_idc (H.266 Spec) */ | u(2) |
| vui_matrix_coeffs /* specifies vui_matrix currently in use as well as chroma format type (RGB, YcBcR,YUV, etc). (H.274 Spec)*/ | u(8) |
| If (( input_chroma_format_idc = = 1 \| input_chroma_format_idc = = 2) && nnpf_joint_model_flag)) | |
| packing_format_idc /* specifies packing format for chroma channels. Currently supports 6 planes for 420 and 4 planes for 422. Dependents on chroma_format_idc and nnpf_joint_model_flag */ | u(3) |
| If(!nnpf_joint_model_flag) | |
| chroma_luma_dependency_flag /* for separate model, defines whether UV channels depend on Y for inference. */ | u(1) |
| precision_format_idc /* describes precision of input data, int8,int16,int32, float16,float32,float64,fixed_pt16,fixed_pt32. ./ | u(3) |
| tensor_format_idc /* describes the format of the input tensor, NCHW or NHWC */ | ue(v) |
| log2_patch_size_minus6 /* describes the spatial patch size of each input pictures. Currently supported sizes: (64,128,256,512) */ | ue(v) |
| if(( Pic WidthInLumaSamples % patchSize ) \|\| ( PicHeightInLumaSamples % patchSize )) | |
| picture_padding_type /* describes which picture padding mode currently used. Currently support zero padding */ | ue(v) |
| patch_boundary_overlap_flag/* describes if patch has overlap boundary */ | |
| if (patch_boundary_overlap_flag) | |
| log2_boundary_overlap_minus3 /*size of horizontal/vertical boundary overlap between patches. Currently support overlap of (8,16,32). | ue(v) |
| } | |

input_chroma_format_idc has the same semantics as specified for the syntax sps_chroma_format_idc.

output_chroma_format_idc has the same semantics as specified for the syntax sps_chroma_format_idc.

vui_matrix_coeffs has the same semantics as specified for the syntax vui_matrix_coeffs packing_format_idc indicates the packing format for luma channel as specified in Table 6. The purpose is to allow all input channels to have the same dimension. FIG. 2 shows a case when packing_format_idc equals to 0, for the YUV420 case. In FIG. 2, one luma channel/plane is interleaved to 4 luma channels to have the same dimension as chroma channels U and V. So YUV420 becomes 6 channels. The similar packing is applied for YUV422 case: YUV422 becomes 4 channels: one luma channel is interleaved into to 2 luma channels to have the same dimension as U and V.

TABLE 6

Example of packing_format_idc interpretation

Figure 3:
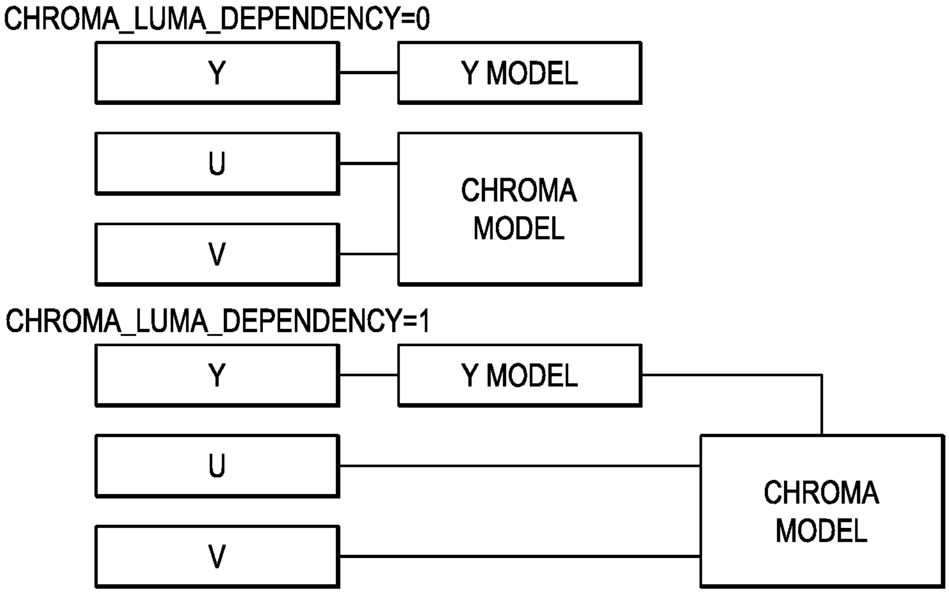
FIG. 3 depicts an example of luma-chroma dependency.

| packing_format_idc | Value |
|---|---|
| 0 | interleaved |
| 1-7 | reserved |

chroma_luma_dependency_flag equal to 1 specifies for the chroma NNPF model the chroma channels are dependent on the luma channel for the input of the NNPF. chroma_luma_dependency_flag equal to 0 specifies the chroma channels are independent of the luma channel for the input of the NNPF. FIG. 3 illustrates an example of the concept.

In an alternative example, one can support more cases.

luma_chroma_dependency_idc specifies the luma and chroma dependency for the input of the luma model and chroma model as specified in Table 7

TABLE 7

Example of luma_chroma_dependency_idc interpretation

| luma_chroma_dependency_idc | Value |
|---|---|
| 0 | 0 (luma and chroma have no inter-dependency) |
| 1 | chroma depends on luma |
| 2 | luma depends on chroma |
| 3 | Luma depends on chroma and chroma depends on luma |

precision_format_idc has the same semantics as the syntax nnpf_param_prec_idc.

tensor_format_idc indicates the tensor format of the input and output tensor as specified in Table 8.

TABLE 8

Example of tensor_format_idc interpretation

| tensor_format_idc | format |
|---|---|
| 0 | NCHW |
| 1 | NHWC |
| 2-3 | reserved |

In Table 8, the variables of N, C, H, W denote:

| variable | meaning |
|---|---|
| N | # of pictures/patches |
| C | # of channels |
| H | Height |
| W | Width |

log 2_patch_size_minus6 plus 6 specifies the base 2 logarithm of the luma patch size. The value of log 2_patch_size_minus6 shall be in the range 0 to 6 inclusive.

The variable PatchSize is defined as follows:

$$PatchSize = 1 << (\text{log2\_patch\_size\_minus6} + 6).$$

Figure 4:
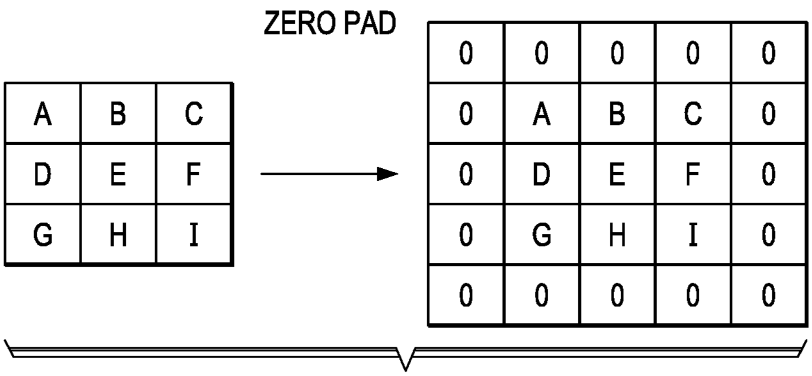
FIG. 4 depicts an example of frame zero-padding.

Note: PatchSize indicates both the height and the width of a patch. In another embodiment, one can specify the patch width and the patch height separately.

picture_padding_type indicates the picture padding type as specified in Table 9. FIG. 4 illustrates a case when picture_padding_type is set to 0.

TABLE 9

Example of picture_padding_type_idc interpretation

| picture_padding_type | padding format |
|---|---|
| 0 | zero (constant) padding |
| 1 | replicate padding |
| 2 | reflect padding |
| 3 | reserved |

When the picture width and height are not multiple of patchSize, padding is required based on picture_padd_type. The padding is operated on the bottom and/or the right of the picture. The decoded output picture width and height in units of luma samples, denoted by PicWidthInLumaSamples and PicHeightInLumaSamples, respectively. The filtered picture width and height in units of luma samples, denoted by FilterPicWidthInLumaSamples and FilterPicHeightInLumaSamples, respectively. The derivation is as follows:

FilterPicWidthInLumaSamples=PicWidthInLumaSamples+patchSize−(PicWidthInLumaSamples%patchSize)

FilterPicHeightInLumaSamples=PicHeightInLumaSamples+patchSize−(PicHeightInLumaSamples%patchSize)

patch_boundary_overlap_flag equal to 1 specifies the patches overlap in the boundary. patch_boundary_overlap_flag equal to 0 specifies the patches do not overlap in the boundary.

log 2_boundary_overlap_minus3 plus 3 specifies the base 2 logarithm of the boundary overlap between horizontal and vertical patches. The value of boundary overlap in units of luma samples is derived to be equal to (1<<(log 2_boundary_overlap_minus3+3). The value of log 2_boundary_overlap_minus3 shall be in the range 0 to 2 inclusive.

It is noted the final input patch size to the NNPF is set equal to $$PatchSize + (\text{patch\_boundary\_overlap\_flag} == 0)\ ?$$

$$0 : 2 * (1 << (\text{log2\_boundary\_overlap\_minus3} + 3))$$

3) Auxiliary Input Information Hint

One of the advantages of using NNPF SEI messaging than pure NNPF is that NNPF SEI messaging is generated during encoding. This allows one to include information related to bitstream characteristics into the SEI: such as QP information, picture/slice type information, partition information, inter/intra map information, classification information, and temporal neighboring pictures as the input to the NNPF. To get the device to be ready to such auxiliary input, one can indicate an auxiliary input information hint message in the CLVS-layer NNPF SEI and carry more detailed information in the picture-layer SEI. An example of auxiliary input hint information is shown in Table 10.

TABLE 10

Example of NNPF auxiliary input hint

| | Descriptor |
|---|---|
| nnpf_auxiliary_input_hint( ) { | |
| nnpf_auxi_input_id /*use bits to indicate auxiliary input: $0^{th}$ bit: QP, $1^{st}$ bit: partition; $2^{nd}$ bit: classification, 3rd bit: temporal neighboring pcitures*/ | u(8) |
| } | |

nnpf_auxi_input_id contains an identifier number that may be used to identify the possible existence of NNPF auxiliary input information. nnpf_auxi_input_id equal to 0 infers that no auxiliary input is used for NNPF in the CLVS. The nnpf_auxi_input_id is interpreted as follows:

The variable QpFlag (bit 0) is set equal to (nnpf_auxi_input_id & 0x01). QpFlag equal to 1 specifies QP map might be the auxiliary input of the NNPF for the current CLVS. QpFlag equal to 0 specifies QP map is not the auxiliary input of the NNPF for the current CLVS. (Note: "&" denotes bitwise AND)

The variable PartitionFlag (bit 1) is set to equal to ((nnpf_auxi_input_id & 0x02)>>1). PartitionFlag equal to 1 specifies partition map might be the auxiliary input of the NNPF for the current CLVS. PartitionFlag equal to 0 specifies partition map is not the auxiliary input of the NNPF for the current CLVS.

The variable ClassificationFlag (bit 2) is set equal to ((nnpf_auxi_input_id & 0x04)>>2). ClassificationFlag equal to 1 specifies classification map might be the auxiliary input of the NNPF for the current CLVS. ClassificationFlag equal to 0 specifies classification map is not the auxiliary input of the NNPF for the current CLVS.

The variable TemporalPicFlag (bit 3) is set equal to ((nnpf_auxi_input_id & 0x08)>>3). TemporalPicFlag equal to 1 specifies temporal neighboring pictures might be the auxiliary input of the NNPF for the current CLVS. TemporalPicFlag equal to 0 specifies temporal neighboring pictures are not the auxiliary input of the NNPF for the current CLVS.

the remaining bits (from bit 4 to bit 7) are reserved for future use by ITU-T|ISO/IEC.

An example of CLVS-layer NNPF SEI is shown in Table 11. The semantics follow the syntax table. In this example, number of NNPF models are looped over picture type and device types.

TABLE 11

Example CLVS-layer NNPF SEI message

| | Descriptor |
|---|---|
| nnpf_sei( payloadSize ) { | |
| nnpf_purpose | uc(v) |
| nnpf_model_info_present_flag | u(1) |
| if( nnpf_model_info_present_flag ){ | |
| nnpf_joint_model_flag | u(1) |
| nnpf_num_pic_type_minus1 | ue(v) |
| nnpf_num_device_type_minus1 | ue(v) |
| num_nnpf_models = (nnpf_joint_model_flag == 0 ? 2 : 1) * ( nnpf_num_pic_type_minus1 + 1 ) * (nnpf_num_device_type_minus1 + 1) | |
| for( i = 0; i < num_nnpf_models; i++ ) {/*loop over # of NNPF models based on color component type, picture type and device type*/ | |
| nnpf_model_id[ i ] /*0$^{th}$ bit for color component, 1$^{st}$ bit for picture type, middle 4 bits for device type*/ | ue(v) |
| num_of_ckpts_minus1 [ nnpf_model_id[i] ] | ue(v) |
| nnpf_topology_and_model_parameters_info(nnpf_model_id[i]) | |
| } | |
| } | |
| nnpf_data_info_present_flag | u(1) |
| if( nnpf_data_info_present_flag ){ | |
| nnpf_data_info( ) | |
| nnpf_auxi_input_id | u(8) |
| } | |

nnpf_purpose indicates the purpose of post-processing filter as specified in Table 12. The value of nnpf_purpose shall be in the range of 0 to $2^{32}$-2, inclusive. Values of nnpf_purpose that do not appear in Table 12 are reserved for future specification by ITU-T|ISO/IEC and shall not be present in bitstreams conforming to this version of this Specification. Decoders conforming to this version of this Specification shall ignore SEI messages that contain reserved values of nnpf_purpose (Ref. [4]).

TABLE 12

Example of nnpf_purpose interpretation

| Value | Interpretation |
|---|---|
| 0 | Visual quality improvement |
| 1 | super resolution |
| 2 | denoising |
| 3 | display mapping |
| other | Reserved |

NOTE-
When a reserved value of nnrpf_purpose is taken into use in the future by ITU-T | ISO/IEC, the syntax of this SEI message could be extended with syntax elements whose presence is conditioned by nnrpf_purpose being equal to that value.

The nnpf_purpose syntax and semantics are taken from Ref. [4]. The allowed range is probably too big for post filter purpose.

nnpf_model_info_present_flag equal to 1 specifies that the nnpf model information is present in the SEI message. nnpf_model_info_present_flag equal to 0 specifies that the nnpf model information is not present in the SEI message.

NOTE—When nnpf model information is not present in the SEI message, the NNPF model should be accessed by some other means not specified in this specification.

nnpf_joint_model_flag equal to 1 specifies that the NNPF uses the same model for all color components. nnpf_joint_model_flag equal to 0 specifies that the nnpf uses the separate model for luma and chroma components. When not present, the value of nnpf_joint_model_flag is inferred to be equal to 0.

Note: when nnpf_joint_model_flag equals to 0, the external link should contain one model for luma component and one model for chroma components.

It is noted that when counting number of models, in one embodiment, one can count one model for both luma and chroma components. Therefore, even if luma and chroma use separate models, because one can only complete one picture with both luma and chroma components by using both models, one counts them as one model. Therefore, num_nnpf_models=(nnpf_num_pic_type_minus1+1)*(nnpf_num_device_type_minus1+1). In another embodiment, one can count luma and chroma components models as individual counts. Therefore, if luma and chroma components use separate models, one counts them as two models. Therefore, num_nnpf_models=(nnpf_joint_model_flag==0?2:1)*(nnpf_num_pic_type_minus1+1)*(nnpf_num_device_type_minus1+1). In Table 11, the latter method is used.

nnpf_num_pic_type_minus1 plus 1 indicates that the number of picture types supported in the nnpf picture type based model. When not present, the value of nnpf_num_pic_type_minus1 is inferred to be equal to 0. The value shall be in the range of 0 to 3, inclusive.

nnpf_num_device_type_minus1 plus 1 indicates that the number of device types supported in the nnpf device type based model. When not present, the value of nnpf_num_device_type_minus1 is inferred to be equal to 0. The value shall be in the range of 0 to 15, inclusive.

nnpf_mode_id[i] contains an identifier number that may be used to identify the ith NNPF model. When not present, the value of nnpf_mode_id is inferred to be equal to 0. The value of nnpf_mode_id[i] shall be in the range of 0 to 255, inclusive. The nnpf_model_id is interpreted as follows:

The variable CompType (bit 0) is set to equal to (nnpf_model_id[i] & 0x01) as specified in Table 13

The variable PicType (bit 1) is set to equal to ((nnpf_model_id[i] & 0x02)>>1) as specified in Table 14

The variable DeviceType (bit 2, 3, 4, 5) is set to equal to ((nnpf_model_id[i] & 0x1C)>>2). The variable displayType is set to equal to (DeviceType & 0x03) as specified in Table 15. The display type is arranged based on display size in ascending order. The variable complexityType is set to equal to ((DeviceType & 0x0C)>>2) as specified in Table 16. The complexityType is arranged based on complexity in ascending order.

TABLE 13

Example of CompType interpretation

| CompType | component type |
|---|---|
| 0 | if nnpf_joint_model_flag == 0 All. (same model is used for both luma and chroma components); else luma components |
| 1 | chroma components |

TABLE 14

Example of PicType interpretation

| PicType | picture type |
|---|---|
| 0 | if nnpf_num_pic_type_minus1 == 0 All (same model used for all picture types); else Intra picture |
| 1 | Inter picture |

Note:
a picture in VVC can contain multiple slices which might have different slice types. Since the SEI is defined on a picture layer, the encoder can decide for such picture with mixed slice types, what PicType the current picture belongs. For example, if more than certain percentage of blocks are coded in intra model in the picture, the picture can be considered as Intra picture.

TABLE 15

Example of displayType interpretation

| displayType | display type |
|---|---|
| 0 | All (same model used ) |
| 1 | Mobile phone |
| 2 | Mobile pad/Laptop |
| 3 | TV/Computer Display |

In another example, one can also add QualityType indication. So different decoded quality can use different model. The quality can be decided by picture level QP.

The variable QualityType (bit 6 and bit 7) is set to equal to ((nnpf_model_id[i] & 0xC0)>>6). The QualityType is indicated in descending order. 0 means highest quality and 3 means worse quality.

Note: An association between QualityType and based QP information can be defined as well. An example is given in Table 16.

TABLE 16

Example of QualityType interpretation

| quality Type | baseQP |
|---|---|
| 0 | <=27 |
| 1 | 27 < baseQP < 32 |
| 2 | 22 < baseQP < 37 |
| 3 | >37 |

num_of_ckpts_minus1[nnpf_model_id[i]] plus 1 specifies the number of the checkpoints for nnpf_model_id[i]. The index of each checkpoint is in increasing order from 0 . . . num_of_ckpts_minus1[nnpf_model_id[i]], inclusively.

In NN literature, checkpoint (ckpt) is used to save the model parameters such as weights and biases in CNN. In our application, ckpt means the same model topology is used. The difference between the ckpts is the value of model parameters.

nnpf_data_info_present_flag equal to 1 indicates that nnpf_data_info( ) is present in the SEI message. nnpf_data_info_present_flag equal to 0 indicates that the nnpf_data_info( ) is not present in the SEI message.

In alternative examples, one can associate nnpf_data_info( ) and nnpf_auxiliary_input_info( ) with nnpf_model_id to have higher flexibility.

TABLE 17

Alternative example of CLVS-layer NNPF SEI message

| | Descriptor |
|---|---|
| nnpf_sei( payloadSize ) { | |
| nnpf_purpose | ue(v) |
| nnpf_model_info_present_flag | u(1) |
| if( nnpf_model_info_present_flag ){ | |
| nnpf_joint_model_flag | u(1) |
| nnpf_num_models_minus1 | ue(v) |
| for( i = 0; i < num_nnpf_models_minus1 + 1; i++ ) {/*loop over # of NNPF models based on color component type, picture type and device type*/ | |
| nnpf_model_id[i] = i | |
| nnpf_topology_and_model_parameters_info(nnpf_model_id) | |
| } | |
| } | |
| nnpf_data_info_present_flag | u(1) |
| if( nnpf_data_info_present_flag ){ | |
| nnpf_data_info( ) | |

TABLE 17-continued

| Alternative example of CLVS-layer NNPF SEI message | Descriptor |
|---|---|
| nnpf_auxi_input_id | u(8) |
| } | |

It is noted that in another embodiment, one can just specify the number of nnpf models using syntax num_nnpf_models_minus1 and assign index i to nnpf_mode_id[i]. The drawback of this method is that nnpf_model_id[i] has no specific meaning and the decoder is using the nnpf model blindly. The advantage is that the bitstream can carry as many models as it prefers. In addition, one does not need to differentiate checkpoints from models strictly. For example, the bitstream can carry two different checkpoints for the same picture type even though for any given picture, only one checkpoint is used.

num_nnpf_models_minus1 plus1 specifies number of NNPF models.

The index of models is in increasing order from 0 . . . num_nnpf_models_minus1, inclusively.

Picture-Layer NNPF SEI

One benefit of using picture layer NNPF SEI (denoted as nnpf_pic_adapt_SEI( )) instead of standalone NNPF is that the SEI can carry adaptation information for each picture. The information can include such parameters as: picture-layer, luma/chroma components and CTU-layer NNPF on/off flags, picture/slice type, picture/slice QP, block level QP, picture/slice/block level classification, picture/slice level inter/intra map, and the like.

To save bit overhead, nnpf_pic_adapt_SEI( ) can refer to CLVS level nnpf_sei( ) for high level controlling.

The persistence scope of the nnpf_pic_adapt_SEI( ) is for the current picture.

As for signaling nnpf_pic_model_id, several methods can be used for Table 11: 1) nnpf_pic_model_id from nnpf_sei( ) can be signalled explicitly in nnpf_pic_adapt_SEI( ) at cost of ue(v) bits. This explicit model is the base model. The bit0 should always be 0 to indicate that the nnpf_pic_model_id represents a luma model. The base model can tell PicType, DeviceType or QualityType. If the model has deviceType option, the user can select the other model based on display Type and complexityType. 2) nnpf_pic_model_id is inferred from the other syntax in nnpf_pic_adapt_SEI accordingly. If the model has deviceType option, the user can select the right model based on displayType and complexityType. if implicit model is used, one needs to signal nnpf_pic_type to select the model from the pools.

Additional nnpf_pic_mode_id_chroma for chroma components can be decided based on nnpf_joint_model_flag derived as following.

if nnpf_joint_model_flag==0 nnpf_pic_mode_id_chroma = nnpf_pic_mode_id + 1 else nnpf_pic_mode_id_chroma = nnpf_pic_mode_id

In Table 17, one can just explicitly signal nnpf_pic_mode_id and nnpf_pic_model_id_chroma if nnpf_joint_model_flag is equal to 0.

For region related information, the region size can be implied to be the same as PatchSize in nnpf_sei( ) or explicitly signalled if the size different from PatchSize. Region size in general should be no smaller than PatchSize and probably be best to be a multiple of PatchSize. For the QP map, classification map, or partition map inside the region, which are used to generate auxiliary input, a smaller unit can be used, but one needs to consider the trade-offs between the accuracy and bit overhead.

The auxiliary input information should be generated either by picture level information or region level information. For example, the QP map can be generated using picture level QP or region based QP information. The classification map can be generated using region based inter/intra information. The partition map can be generated using region-based partition information Table 18 shows an example of nnpf_pic_adapt_SEI( ) In this example, for simplicity, one sends corresponding nnpf_mode_id directly. It allows to switch picture level and CTU level on/off. Region size is inferred to be the same as the patchSize defined in nnpf_SEI( ).

TABLE 18

| Example of Picture-layer NNPF SEI messaging | Descriptor |
|---|---|
| nnpf_pic_adapt_SEI( ) { | |
| if (vui_matrix_coeffs == 0) /*RGB,GBR,XYZ case*/ | |
| nnpf_pic_enabled_flag | u(1) |
| else { | |
| nnpf_pic_luma_enabled_flag | u(1) |
| nnpf_pic_chroma_enabled_flag | u(1) |
| nnpf_pic_enabled_flag = nnpf_pic_luma_enabled_flag \|\| nnpf_pic_chroma_enabled_flag ) | |
| } | |
| if( nnpf_pic_enabled_flag ) { | |
| nnpf_pic_model_id | ue(v) |
| if (num_of_ckpts_minus1[ nnpf_pic_model_id ]) | |

TABLE 18-continued

Example of Picture-layer NNPF SEI messaging

| | Descriptor |
|---|---|
| nnpf_pic_ckpt_idx | u(v) |
| if (QpFlag) | |
| nnpf_qp_info_present_flag | u(1) |
| nnpf_region_info_present_flag | u(1) |
| if( nnpf_region_info_present_flag) { | |
| if (nnpf_qp_info_present_flag) | |
| nnpf_region_qp_present_flag | u(1) |
| if (PartitionFlag && PicType==Intra) | |
| nnpf_region_ptt_present_flag | u(1) |
| if (ClassificationFlag) | |
| nnpf_region_clfc_present_flag | u(1) |
| num_regions = | |
| ( FilterPic WidthInLumaSamples / PatchSize ) | |
| * ( FilterPicHeightInLumaSamples / PatchSize ) | |
| for( i = 0; i < num_regions; i++ ) {/*loop over # of regions*/ | |
| nnpf_region_enabled_flag[ i ] | |
| if( nnpf_region_qp_present_flag ) | |
| qp_delta_abs_map[ i ] | ue(v) |
| if( qp_delta_abs_map[ i ] ) | |
| qp_delta_sign_map_flag | u(1) |
| if( nnpf_region_ptt_present_flag ) | |
| ptt_map[ i ] | ue(v) |
| if( nnpf_region_clfc_present_flag ) | |
| clfc_map[ i ] | ue(v) |
| } | |
| } | |
| if( nnpf_qp_info_present_flag && !nnpf_region_qp_present_flag ) | |
| nnpf_pic_qp_minus_26 | se(v) |
| } | |
| } | |

nnpf_pic_enabled_flag equal to 1 specifies nnpf is applied to the current picture. nnpf_pic_enabled_flag equal to 0 specifies nnpf is not applied to the current picture. When not present, the value of nnpf_pic_enabled_flag is inferred to be equal to 0.

nnpf_pic_luma_enabled_flag equal to 1 specifies nnpf is applied to the luma components of the current picture. nnpf_pic_luma_enabled_flag equal to 0 specifies nnpf is not applied to the luma components of the current picture. When not present, the value of nnpf_pic_luma_enabled_flag is inferred to be equal to 0.

nnpf_pic_chroma_enabled_flag equal to 1 specifies nnpf is applied to the chroma components of the current picture. nnpf_pic_chroma_enabled_flag equal to 0 specifies nnpf is not applied to the chroma components of the current picture. When not present, the value of nnpf_pic_chroma_enabled_flag is inferred to be equal to 0.

nnpf_pic_model_id specifies the nnpf_mode_id used for the current picture.

nnpf_pic_ckpt_idx specifies the checkpoint index used for nnpf_pic_model_id. The value of nnpf_pic_ckpt_idx is in the range of 0 . . . num_ckpts_minus1[nnpf_pic_model_id], inclusively.

nnpf_qp_info_present_flag equal to 1 specifies that the current SEI contains QP information. nnpf_qp_info_present_flag equal to 0 specifies that the current SEI does not contain QP information. When not present, the value of nnpf_qp_info_present_flag is inferred to be equal to 0.

nnpf_region_info_present_flag equal to 1 specifies that the current SEI contains region information. nnpf_region_info_present_flag equal to 0 specifies that the current SEI does not contain region information. When not present, the value of nnpf_region_info_present_flag is inferred to be equal to 0.

nnpf_region_qp_present_flag equal to 1 specifies that the current SEI contains region based QP information. nnpf_region_qp_present_flag equal to 0 specifies that the current SEI does not contain region based QP information. When not present, the value of nnpf_region_qp_present_flag is inferred to be equal to 0.

nnpf_region_ptt_present_flag equal to 1 specifies that the current SEI contains region-based partition information. nnpf_region_ptt_present_flag equal to 0 specifies that the current SEI does not contain region-based partition information. When not present, the value of nnpf_region_ptt_present_flag is inferred to be equal to 0.

nnpf_region_clfc_present_flag equal to 1 specifies that the current SEI contains region-based classification information. nnpf_region_clfc_present_flag equal to 0 specifies that the current SEI does not contain region-based classification information. When not present, the value of nnpf_region_clfc_present_flag is inferred to be equal to 0.

Note: nnpf_region_qp/ptt/clfc/_present_flag could also be implicitly inferred from nnpf_pic_model_id, for example, only when picType=Intra, one will need that region-level information.

nnpf_region_enabled_flag[i] equal to 1 specified that the nnpf is enabled for the i-th region. nnpf_region_enabled_flag[i] equal to 0 specified that the nnpf is not enabled for the i-th region. When not present, the value of nnpf_region_enabled_flag[i] is inferred to be equal to 0.

qp_delta_abs_map[i] has the same semantics as specified for cu_qp_delta_abs.

qp_delta_sign_map_flag[i] has the same semantics as specified for cu_qp_delta_sign_flag.

ptt_map[i] specifies the partiton map for the i-th region. The partion map is represented using the same intepretaton as MaxMttDepthY. The value is in the range of 0 to log 2(PatchSize)−3, inclusively.

clfc_map[i] specifies the classification map for the i-th region.

In one example, the classification map only indicates intra or inter.

If PicType is intra, clfc_map[i] equal to 0 specifies the classification map is intra for the ith region, clfc_map[i] equal to 1 specifies the classification map is inter without residue for the ith region, otherwise. clfc_map[i] equal to 2 specifies the classification map is inter with residue for the ith region.

Otherwise, clfc_map[i] equal to 0 specifies the classification map is inter without residue for the ith region, clfc_map[i] equal to 1 specifies the classification map is inter with residue for the ith region, otherwise clfc_map[i] equal to 0 specifies the classification map is intra for the ith region.

The CLVS-layer NNPF SEI messaging of Table 11 (which may load data as defined in Tables 1-15) may require metadata information that is deemed too large or unnecessary in some applications. To reduce the payload size, an example of an alternative and simplified CLVS NNPF SEI message is illustrated in Table 19. To generate the syntax of Table 19, some of the earlier defined parameters were deleted as explained below.

Parameter nnpf_num_device_type_minus1 is skipped because of lack of experimental support of NNPF across multiple devices. Parameter nnpf_model_upd_param_present_flag is skipped because it is from the Ref. [4] and there is no demonstrated need. Parameter nnpf_latency_idc is skipped. This is also because it requires tests under too many different resolution and frame-rate configurations. Even if the results are available, the results can only be based for a baseline GPU. In practice, devices may use a variety of GPU architectures making this indicator less accurate or useful. Parameters input_chroma_format_idc and output_chroma_format_idc have been merged to one: nnpf_chroma_format_idc, since it is considered unlikely that in practice the input and output of the NNPF will have different chroma formats. Parameter precision_format_idc is skipped because its function to indicate precision may be considered duplicate to the nnpf_param_prec_idc value defined previously. Parameter tensor_format_idc is skipped because it is highly correlated to the previously defined nnpf_model_storage_form_idc value. A storage format, such as ONNX, usually specifies the tensor format as well. patch_boundary_overlap_flag is skipped because a deblocking filter is generally applied in the bitstream. So for NNPF, overlap most likely is not needed.

TABLE 19

Example of simplified NNPF SEI messaging

| | Descriptor |
|---|---|
| nnpf_sei( payloadSize ) { | |
| nnpf_purpose | ue(v) |
| nnpf_model_info_present_flag | u(1) |
| if( nnpf_model_info_present_flag ){ | |
| nnpf_joint_model_flag | u(1) |
| nnpf_num_pic_type_minus1 | ue(v) |
| num_nnpf_models = (nnpf_joint_model_flag == 0 ? 2 : 1) * ( nnpf_num_pic_type_minus1 + 1) | |
| for( i = 0; i < num_nnpf_models; i++ ) {/*loop over # of NNPF models based on picture type*/ | |
| nnpf_model_id[i] = (nnpf_joint_model_flag == 0 ? i : (i<<1)) | |
| num_of_ckpts_minus1[ i ] | ue(v) |
| nnpf_model_exter_link_flag[ i ] /*signal if use external link*/ | u(1) |
| if( nnpf_model_exter_link_flag[ i ] ){ | |
| j = 0 | |
| do | |
| nnpf_exter_uri[ j ] | b(8) |
| while( nnpf_exter_uri[ j++ ] != 0 ) | |
| } | |
| nnpf_model_storage_form_idc[ i ] /*signal NN storage and exchange format, ONNX, NNEF, Tensorflow, PyTorch, and reserved bits for future extentsion*/ | u(3) |
| nnpf_model_complexity_ind_present_flag[ i ] /*signal NN complexity related parameters */ | u(1) |
| if( nnpf_model_complexity_ind_present_flag[ i ] ){ | |
| nnpf_param_prec_idc[ i ] | u(4) |
| log2_nnpf_num_param_minus11[ i ] | ue(v) |
| nnpf_num_param_frac[ i ] | ue(v) |
| log2_prec_denom[ i ] | ue(v) |
| nnpf_num_op[ i ] | ue(v) |
| } | |
| } | |
| nnpf_data_info_present_flag | u(1) |
| if( nnpf_data_info_present_flag ){ | |
| nnpf_chroma_format_idc /* descriptor of chroma format in terms of number of channels and sampling rate. Follows sps_chroma_format_idc (H.266 Spec) */ | u(2) |
| vui_matrix_coeffs /* specifies vui_matrix currently in use as well as chroma format type (RGB, YcBcR,YUV, etc). (H.274 Spec)*/ | u(8) |
| if ( ( input_chroma_format_idc = = 1 \|\| input_chroma_format_idc = = 2) && nnpf_joint_model_flag) ) | |
| packing_format_idc /* specifies packing format for chroma channels. Currently supports 6 planes for 420 and 4 planes for 422. Dependents on chroma_format_idc and nnpf_joint_model_flag */ | u(3) |
| if(!nnpf_joint_model_flag) | |
| chroma_luma_dependency_flag /* for separate model, defines whether | u(1) |

TABLE 19-continued

Example of simplified NNPF SEI messaging

| | Descriptor |
|---|---|
| UV channels depend on Y for inference. * / | |
| log2_patch_size_minus6 /* describes the spatial patch size of each input pictures. Currently supported sizes: (64,128,256,512) */ | ue(v) |
| if( ( Pic WidthInLumaSamples % patchSize ) \|\| ( PicHeightInLumaSamples % patchSize ) ) | |
| picture_padding_type /* describes which picture padding mode currently used. Currently support zero padding*/ | ue(v) |
| } | |
| nnpf_auxi_input_id | ue(v) |
| } | |

Given the above syntax, an example of how to apply the NNPF SEI message in Table 17 is illustrated as follows. Suppose NNPF is used to improve visual quality, then nnpf_purpose is set to 0. Given the need to signal NNPF model related information, nnpf_model_info_present_flag is set to 1. If the luma and chroma use a different model, then nnpf_joint_model_flag is set to 0. Different models are applied to intra and inter pictures, hence, nnpf_num_pic_type_minus1 is set to 1. num_of_nnpf_models is set to 4 (luma/chroma and inter/inter). Given these four models, the value of nnpf_model_id[0] is set to 0, which is used for luma component and intra pictures, the value of nnpf_model_id[1] is set to 1, which is used for chroma component and intra picture, the value of nnpf_model_id[2] is set to 2, which is used for luma component and inter pictures, the value of nnpf_model_id[3] is set to 3, which is used for chroma component and inter pictures. The number of checkpoints provided for each model is set to 1, so num_of_ckpts_minus1[0]/[1]/[2]/[3] are all set to 0. One can provide external web link for the two model IDs. so nnpf_model_exter_link_flag[0]/[1] is set to 1. The web link is coded using IETF Internet Standard 66. For all models, Pytorch is used, so nnpf_model_storage_form_idc[0]/[1] is set to 3. To indicate the model complexity, nnpf_model_complexity_ind_present_flag[0]/[1] is set to 1. The model uses single-precision floating point format. The value of nnpf_param_prec_idc[0]/[1] is set to 4. The number of model parameters for each id is 214k=1.6327*2^17. So value of log 2_nnpf_num_param_minus11[0]/[1] is set to 6. log 2_prec_denom[0]/[1] is set to 5, nnpf_num_param_frac[0]/[1] is set to 21. So the maximal number parameters are set equal to 217k. The number of operations as kMac/pixel is 33.6k. The value of nnpf_num_op[0]/[1] is set to 34.

Continuing with the signal data formation information, nnpf_data_info_present_flag is set to 1. The input and output of NNPF is YUV420, so nnpf_chroma_format_idc is set to 1 (420 format). vui_matrix_coeffs is set to 1 or 9 (YUV). Since separate models are used for the luma and chroma component, nnpf_joint_model_flag is 0, hence there is no need to signal packing_format_idc. The chroma model also uses luma information, hence, chroma_luma_dependency_flag is set to 1. The patch size is 128, so the value of log 2_patch_size_minus6 is set to 1. Suppose the picture size is 4k, one will need to add padding. For replicate padding, the value of picture_padding_type is set to 1. Since the deblocking is used in the bitstream, no overlap for patches is used. For auxiliary input information, QP map is used and the value of nnpf_auxi_input_id is set to 1.

The Picture Level NNPF SEI messaging of Table 18 may require region level metadata which may be too large or of little use in many applications. To reduce the overall payload size and focus on QP mapping SEI information, an example of an alternative and simplified Picture level NNPF SEI message is illustrated in Table 20. To generate the syntax, some of the earlier defined parameters are deleted as will be explained below.

TABLE 20

Example of simplified NNFP Picture-layer SEI messaging

| | Descriptor |
|---|---|
| nnpf_pic_adapt_SEI( ) { | |
| if (vui_matrix_coeffs == 0) /*RGB,GBR,XYZ case*/ | |
| nnpf_pic_enabled_flag | u(1) |
| else { | |
| nnpf_pic_luma_enabled_flag | u(1) |
| nnpf_pic_chroma_enabled_flag | u(1) |
| nnpf_pic_enabled_flag = nnpf_pic_luma_enabled_flag \|\| nnpf_pic_chroma_enabled_flag ) | |
| } | |
| if( nnpf_pic_enabled_flag ) { | |
| nnpf_pic_model_id | ue(v) |
| if (num_of_ckpts_minus1 [ nnpf_pic_model_id ]) | |
| nnpf_pic_ckpt_idx | u(v) |
| if (nnpfc_separate_colour_model_flag && nnpf_pic_chroma_enabled_flag) { | |
| nnpf_pic_model_id_chroma | ue(v) |
| if (num_of_ckpts_minus1[ nnpf_pic_model_id_chroma ]) | |
| nnpf_pic_ckpt_idx | u(v) |
| } | |
| if (nnpf_auxi_input_id == 1) | |

TABLE 20-continued

Example of simplified NNFP Picture-layer SEI messaging

```
                                                                        Descriptor
    nnpf_qp_info_present_flag                                               u(1)
  if(nnpf_qp_info_present_flag) {
    nnpf_region_qp_present_flag                                             u(1)
    if( nnpf_region_qp_present_flag ) {
      num_regions = ( FilterPicWidthInLumaSamples / PatchSize )
* ( FilterPicHeightInLumaSamples / PatchSize )
      for( i = 0; i < num_regions; i++ ) {/*loop over # of regions*/
        qp_delta_abs_map[ i ]                                               ue(v)
        if( qp_delta_abs_map[ i ] )
        qp_delta_sign_map_flag                                              u(1)
      }
    }
    else
      nnpf_pic_qp_minus26                                                   se(v)
  }
 }
}
```

where:

nnpf_pic_model_id_chroma specifies the index of the model used for the current picture for chroma component. The value of nnpf_pic_model_id_chroma shall be in the range of 0 . . . nnpfc_max_num_models, inclusive, for this version of this Specification. When not present, the value of nnpf_pic_model_id_chroma is inferred to be equal to nnpf_pic_model_id.

nnpf_pic_ckpt_idx_chroma specifies the index of the checkpoint for use with the model for the current picture for chroma component. The value of nnpf_pic_ckpt_idx_chroma shall be in the range of 0 . . . nnpfc_max_num_ckpts_minus1[nnpf_mode_id_chroma], inclusive. When not present, the value of nnpf_pic_ckpt_idx_chroma is inferred to be equal to nnpf_pic_ckpt_idx.

Parameters related to region level messaging are all removed, and redundancies created by said parameters are also eliminated. More specifically, nnpf_region_info_present_flag is deemed unnecessary and redundant due to the use of nnpf_qp_info_present_flag. Similarly, nnpf_region_ptt_present_flag, ptt_map, and clfc_map are not needed if region-level partitioning is not available.

Presence of Auxiliary Data in the Neural-Network Tensor

In Ref. [21], auxiliary input data can be present in the neural-network input tensor only when the value of nnpfc_inp_order_idc is equal to 3, i.e., when the input tensor is configured as four interleaved luma channels and two chroma channels. Currently, auxiliary input data cannot be present in the input tensor for luma-only, chroma-only, and 3-channel luma and chroma configurations, i.e., nnpfc_inp_order_idc equal to 0, 1, and 2, respectively. It is asserted that auxiliary input data can be beneficial for all input tensor configurations.

As suggested earlier (e.g., see Table 10 and syntax parameter nnpf_auxi_input_id), it is proposed to add syntax element nnpfc_auxiliary_input_idc and corresponding semantics to the NNPF CLVS SEI message, which in Ref. [21] is denoted as NNPFC SEI, so that the auxiliary data can be present in the input tensor for every allowed configuration of the input tensor, i.e., for every value of nnpfc_inp_order_idc. As in the current Ref. [21] draft of the VSEI amendment, it is proposed that auxiliary input data be limited to a signal derived from the luma quantization parameter, SliceQpy. The parameter nnpfc_auxiliary_input_idc was also previously proposed in Ref. [22].

Indication of Color Description of Neural-Network Tensors

Colour description information for neural-network tensors cannot be signaled using the current text of Ref. [21]. It is asserted that colour description information for neural-network tensors can be beneficial. For example, $IC_TC_P$ may be preferred when applying a neural-network post filter to an HDR WCG signal.

It is proposed to add syntax elements nnpfc_separate_colour_description_present_flag, nnpfc_colour_primaries, nnpfc_transfer_characteristic, and nnpfc_matrix_coeffs and corresponding semantics to the NNPFC SEI message. It is proposed that the syntax and semantics be modelled on those for the film grain characteristics SEI message.

Additionally, the following constraints are proposed for nnpfc_purpose, nnpfc_inp_order_idc, and nnpfc_out_order_idc when nnpfc_matrix_coeffs is equal to 0, which is typically used for GBR (RGB) and YZX 4:4:4 chroma format:

1. nnpfc_purpose shall not be equal to 2 (chroma upsampling to 4:4:4 chroma format) or 4 (increasing the width or height of the cropped decoded output picture and up-sampling the chroma format)
2. nnpfc_inp_order_idc shall not be equal to 1 (two chroma channels and no luma channel in the input tensor) or 3 (four interleaved luma channels and two chroma channels in the input tensor)
3. nnpfc_out_order_idc shall not be equal to 1 (only two chroma channels in the output tensor) or 3 (four interleaved luma channels and two chroma channels in the output tensor)

Indication of Dependencies for Multiple Activate Neural-Network Post-Filters

It is asserted that it can be beneficial to apply neural-network post-filters in specific sequence when more than one neural-network post-filter is activated for the current picture. For example, an output tensor of a luma-only neural-network post-filter can be used to derive an input tensor of a luma-chroma neural-network post-filter. As another example, an output tensor of a neural-network post-filter to increase the width or height of a decoded picture (nnpfc_purpose equal to 2, 3, or 4) can be used to derive the input tensor of a neural-network post-filter to improve video quality (nnpfc_purpose equal to 1).

It is proposed to add three syntax elements and corresponding semantics to NNPFA SEI message as follows:

1. nnpfa_independent_flag to indicate preference that the neural-network post-filter signalled in the SEI be either independent of other neural-network post-filters that may also be used for the current picture, or dependent on the output of one or more such neural-network post-filters
2. nnpfa_num_dependencies_minus1 to indicate the number of neural-network post-filters on which the current neural-network post-filter may depend
3. nnpfa_dependency_nnpfa_id[i] to specify the identifying number, nnpfa_id, of the ith neural-network post-processing filter on which the current neural-network filter may depend Neural-Network Post-Filter Characteristics (NNPFC) SEI Message Given these proposed new syntax elements, the following table represents a revised NNPF CLVS or NNPFC SEI message. Changes over Ref. [21] are denoted using an Italic font.

TABLE 21

Example amendments to the syntax of the NNPFC SEI message

| | Descriptor |
|---|---|
| nn_post_filter_characteristics( payloadSize ) { | |
| nnpfc_id | ue(v) |
| nnpfc_mode_idc | ue(v) |
| if( nnpfc_mode_idc = = 1 ) { | |
| nnpfc_purpose | ue(v) |
| if( nnpfc_purpose = = 2 \|\| nnpfc_purpose = = 4 ) { | |
| nnpfc_out_sub_width_c_flag | u(1) |
| nnpfc_out_sub_height_c_flag | u(1) |
| } | |
| if( nnpfc_purpose == 3 \|\| nnpfc_purpose = = 4 ) { | |
| nnpfc_pic_width_in_luma_samples | ue(v) |
| nnpfc_pic_height_in_luma_samples | ue(v) |
| } | |
| /* input and output formatting */ | |
| nnpfc_component_last_flag | u(1) |
| nnpfc_inp_sample_idc | ue(v) |
| if( nnpfc_inp_sample_idc = = 4 ) | |
| nnpfc_inp_tensor_bitdepth_minus8 | ue(v) |
| ***nnpfc_auxiliary_inp_idc*** | *ue(v)* |
| ***nnpfc_separate_colour_description_present_flag*** | *u(1)* |
| *if( nnpfc_separate_colour_description_present_flag ) {* | |
| ***nnpfc_colour_primaries*** | *u(8)* |
| ***nnpfc_transfer_characteristics*** | *u(8)* |
| ***nnpfc_matrix_coeffs*** | *u(8)* |
| *}* | |
| nnpfc_inp_order_idc | ue(v) |
| nnpfc_out_sample_idc | ue(v) |
| if( nnpfc_out_sample_idc = = 4 ) | |
| nnpfc_out_tensor_bitdepth_minus8 | ue(v) |
| nnpfc_out_order_idc | ue(v) |
| nnpfc_constant_patch_size_flag | u(1) |
| nnpfc_patch_width_minus1 | ue(v) |
| nnpfc_patch_height_minus1 | ue(v) |
| nnpfc_overlap | ue(v) |
| nnpfc_padding_type | ue(v) |
| nnpfc_complexity_idc | ue(v) |
| if( nnpfc_complexity_idc > 0 ) | |
| nnpfc_complexity_element( nnpfc_complexity_idc ) | |
| } | |
| /* filter specified or updated by ISO/IEC 15938-17 bitstream */ | |
| if( nnpfc_mode_idc = = 1 ) { | |
| while( !byte_aligned( ) ) | |
| nnpfc_reserved_zero_bit | u(1) |
| for( i = 0; more_data_in_payload( ); i++ ) | |
| nnpfc_payload_byte[ i ] | b(8) |
| } | |
| } | |
| nnpfc_complexity_element( nnpfc_complexity_idc ) { | |
| if( nnpfc_complexity_idc = = 1 ) { | |
| nnpfc_parameter_type_flag | u(1) |
| nnpfc_log2_parameter_bit_length_minus3 | u(2) |
| nnpfc_num_parameters_idc | u(8) |
| nnpfc_num_kmac_operations_idc | ue(v) |
| } | |
| } | |

Neural-Network Post-Filter Characteristics SEI Message Semantics

Compared to the original text and semantics for NNPFC, the following amendments are proposed.

This SEI message specifies a neural network that may be used as a post-processing filter. The use of specified post-processing filters for specific pictures is indicated with neural-network post-filter activation SEI messages.

Use of this SEI message requires the definition of the following variables:

Cropped decoded output picture width and height in units of luma samples, denoted herein by InpPicWidthInLumaSamples and InpPicHeightInLumaSamples, respectively.

Luma sample array CroppedYPic[y][x] and chroma sample arrays CroppedCbPic[y][x] and CroppedCrPic[y][x], when present, of the cropped decoded output picture for vertical coordinates y and horizontal coordinates x, where the top-left corner of the sample array has coordinates y equal to 0 and x equal to 0.

Bit depth BitDepthY for the luma sample array of the cropped decoded output picture.

Bit depth BitDepthC for the chroma sample arrays, if any, of the cropped decoded output picture.

Chroma subsampling ratio relative to luma denoted as InpSubWidthC and InpSubHeightC.

When nnpfc_auxiliary_input_idc is equal to 1, then SliceQpy denotes the initial luma quantization parameter value.

When this SEI message specifies a neural network that may be used as a post-processing filter, the semantics specify the derivation of the luma sample array FilteredYPic[y][x] and chroma sample arrays FilteredCbPic[y][x] and FilteredCrPic[y][x], as indicated by the value of nnpfc_out_order_idc, that contain the output of the post-processing filter.

nnpfc_auxiliary_input_idc not equal to 0 specifies auxiliary input data is present in the input tensor of the neural-network post-filter. nnpfc_auxiliary_input_id equal to 0 indicates that auxiliary input data is not present in the input tensor. nnpfc_auxiliary_input_idc equal to 1 specifies that auxiliary input data is derived from as specified in Table 23. Values of nnpfc_auxiliary_input_id greater than 1 are reserved for future specification by ITU-T|ISO/IEC and shall not be present in bitstreams conforming to this version of this Specification. Decoders conforming to this version of this Specification shall ignore SEI messages that contain reserved values of nnpfc_inp_order_idc.

nnpfc_separate_colour_description_present_flag equal to 1 indicates that a distinct combination of colour primaries, transfer characteristics, and matrix coefficients for the neural-network post-filter characteristics specified in the SEI message is present in the neural-network post-filter characteristics SEI message syntax. nnfpc_separate_colour_description_present_flag equal to 0 indicates that the combination of colour primaries, transfer characteristics, and matrix coefficients for the film grain characteristics specified in the SEI message are the same as indicated in VUI parameters for the CLVS.

nnpfc_colour_primaries has the same semantics as specified in clause 7.3 of Ref. [3] for the vui_colour_primaries syntax element, except as follows:

nnpfc_colour_primaries specifies the colour primaries of the neural-network post-filter characteristics specified in the SEI message, rather than the colour primaries used for the CLVS.

When nnpfc_colour_primaries is not present in the neural-network post-filter characteristics SEI message, the value of nnpfc_colour_primaries is inferred to be equal to vui_colour_primaries.

nnpfc_transfer_characteristics has the same semantics as specified in clause 7.3 of Ref. [3] for the vui_transfer_characteristics syntax element, except as follows:

nnpfc_transfer_characteristics specifies the transfer characteristics of the neural-network post-filter characteristics specified in the SEI message, rather than the transfer characteristics used for the CLVS.

When nnpfc_transfer_characteristics is not present in the neural-network post-filter characteristics SEI message, the value of nnpfc_transfer_characteristics is inferred to be equal to vui_transfer_characteristics.

nnpfc_matrix_coeffs has the same semantics as specified in clause 7.3 of Ref. [3] for the vui_matrix_coeffs syntax element, except as follows:

nnpfc_matrix_coeffs specifies the matrix coefficients of the neural-network post-filter characteristics specified in the SEI message, rather than the matrix coefficients used for the CLVS.

When nnpfc_matrix_coeffs is not present in the neural-network post-filter characteristics SEI message, the value of fg_matrix_coeffs is inferred to be equal to vui_matrix_coeffs.

The values allowed for nnpfc_matrix_coeffs are not constrained by the chroma format of the decoded video pictures that is indicated by the value of ChromaFormatIdc for the semantics of the VUI parameters.

When nnpfc_matrix_coeffs equals to 0, nnpfc_purpose shall not be equal to 2 or 4, nnpfc_inp_order_idc shall not be equal to 1 or 3, and nnpfc_out_order_idc shall not be equal to 1 or 3.

TABLE 22

Proposed amendment to Table 21 of Ref. [21]-Informative description of nnpfc_inp_order_idc values

| nnpfc_inp_order_idc | Description |
|---|---|
| 0 | *When nnpfc_auxiliary_input_idc is equal to 0,* one luma matrix is present in the input tensor, thus the number of channels is 1.. *Otherwise, nnpfc_auxiliary_input_idc is not equal to 0 and one luma matrix and one auxiliary input matrix are present, thus the number of channels is 2.* |
| 1 | *When nnpfc_auxiliary_input_idc is equal to 0, two* chroma matrices are present in the input tensor, thus the number of channels is 2. *Otherwise, nnpfc_auxiliary_input_idc is not equal to 0 and two chroma matrices and one auxiliary input matrix are present, thus the number of channels is 3.* |
| 2 | *When nnpfc_auxiliary_input_idc is equal to 0,* one luma and two chroma matrices are present in the input tensor, thus the number of channels is 3. *Otherwise, nnpfc_auxiliary_input_idc is not equal to 0 and one luma matrix, two chroma matrices and one auxiliary input matrix are present, thus the number of channels is 4.* |

TABLE 22-continued

Proposed amendment to Table 21 of Ref. [21]-Informative description of nnpfc_inp_order_idc values

| nnpfc_inp_order_idc | Description |
|---|---|
| 3 | *When nnpfc_auxiliary_input_idc is equal to 0, four luma matrices and two chroma matrices are present in the input tensor, thus the number of channels is 6. Otherwise, nnpfc_auxiliary_input_idc is not equal to 0 and* four luma matrices, two chroma matrices and one auxiliary input matrix are present, thus the number of channels is 7. The luma channels are derived in an interleaved manner as illustrated in FIG. 12. This nnpfc_inp_order_idc can only be used when the chroma format is 4:2:0. |
| 4 . . . 255 | reserved |

Because of the proposed new syntax, Table 23 in Ref. [21] may be updated as follows.

TABLE 23

Example Revision of Table 23 in Ref. [21]: Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| 0 | for( yP = −overlapSize; yP < inpPatchHeight + overlapSize; yP++)<br>for( xP = −overlapSize; xP < inpPatch Width + overlapSize; xP++ ) {<br>inpVal = InpY( InpSampleVal( cTop + yP, cLeft + xP, InpPicHeightInLumaSamples,<br>InpPicWidthtInLumaSamples, CroppedYPic ) )<br>if( nnpfc_component_last_flag = = 0 )<br>inputTensor[ 0 ][ 0 ][ yP + overlapSize ][ xP + overlapSize ] = inpVal<br>else<br>inputTensor[ 0 ][ yP + overlapSize ][ xP + overlapSize ][ 0 ] = inpVal<br>*if(nnpfc_auxiliary_input_idc = = 1) {*<br>*if( nnpfc_component_last_flag = = 0 )*<br>*inputTensor[ 0 ][ 1 ][ yP + overlapSize ][ xP + overlapSize ] =* $2^{(SliceQp_Y-42)/6}$<br>*else*<br>*inputTensor[ 0 ][ yP+overlapSize ][ xP+overlapSize][ 1 ]=* $2^{(SliceQp_Y-42)/6}$<br>*}*<br>} |
| 1 | for( yP = −overlapSize; yP < inpPatchHeight + overlapSize; yP++)<br>for( xP = −overlapSize; xP < inpPatch Width + overlapSize; xP++ ) {<br>inpCbVal = InpC( InpSampleVal( cTop + yP, cLeft + xP, InpPicHeightInLumaSamples / InpSubHeightC,<br>InpPicWidthtInLumaSamples / InpSubWidthC, CroppedCbPic ) )<br>inpCrVal = InpC( InpSampleVal( cTop + yP, cLeft + xP, InpPicHeightInLumaSamples / InpSubHeightC,<br>InpPicWidthtInLumaSamples / InpSubWidthC, CroppedCrPic ) )<br>if( nnpfc_component_last_flag = = 0 ) {<br>inputTensor[ 0 ][ 0 ][ yP + overlapSize ][ xP + overlapSize ] = inpCbVal<br>inputTensor[ 0 ][ 1 ][ yP + overlapSize ][ xP + overlapSize ] = inpCrVal<br>} else {<br>inputTensor[ 0 ][ yP + overlapSize ][ xP + overlapSize ][ 0 ] = inpChVal<br>inputTensor[ 0 ][ yP + overlapSize ][ xP + overlapSize ][ 1 ] = inpCrVal<br>}<br>*if(nnpfc_auxiliary_input_idc = = 1) {*<br>*if( nnpfc_component_last_flag = = 0 )*<br>*inputTensor[ 0 ][ 2 ][ yP + overlapSize ][ xP + overlapSize ] =* $2^{(SliceQp_Y-42)/6}$<br>*else*<br>*inputTensor[ 0 ][ yP + overlapSize ][ xP + overlapSize ][ 2 ] =* $2^{(SliceQp_Y-42)/6}$<br>*}*<br>} |
| 2 | for( yP = −overlapSize; yP < inpPatchHeight + overlapSize; yP++)<br>for( xP = −overlapSize; xP < inpPatch Width + overlapSize; xP++ ) {<br>yY = cTop + yP<br>xY = cLeft + xP<br>yC = yY / InpSubHeightC<br>xC = xY / InpSubWidthC<br>inpYVal = Inp Y( InpSampleVal( yY, xY, InpPicHeightInLumaSamples,<br>InpPicWidthtInLumaSamples, CroppedYPic ) )<br>inpCbVal = InpC( InpSample Val( yC, xC, InpPicHeightInLumaSamples / InpSubHeightC,<br>InpPicWidthtInLumaSamples / InpSubWidthC, CroppedCbPic ) )<br>inpCrVal = InpC( InpSampleVal( yC, xC, InpPicHeightInLumaSamples / InpSubHeightC,<br>InpPicWidthtInLumaSamples / InpSubWidthC, CroppedCrPic ) )<br>if( nnpfc_component_last_flag = = 0 ) { |

TABLE 23-continued

Example Revision of Table 23 in Ref. [21]: Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| | inputTensor[ 0 ][ 0 ][ yP + overlapSize ][ xP + overlapSize ] = inpYVal<br>inputTensor[ 0 ][ 1 ][ yP + overlapSize ][ xP + overlapSize ] = inpCbVal<br>inputTensor[ 0 ][ 2 ][ yP + overlapSize ][ xP + overlapSize ] = inpCrVal<br>} else {<br>inputTensor[ 0 ][ yP + overlapSize ][ xP + overlapSize ][ 0 ] = inpYVal<br>inputTensor[ 0 ][ yP + overlapSize ][ xP + overlapSize ][ 1 ] = inpCbVal<br>inputTensor[ 0 ][ yP + overlapSize ][ xP + overlapSize ][ 2 ] = inpCrVal<br>}<br>*if(nnpfc_auxiliary_input_idc = = 1) {*<br>*if( nnpfc_component_last_flag = = 0 )*<br>*inputTensor[ 0 ][ 3 ][ yP + overlapSize ][ xP + overlapSize ] =* $2^{(SliceQp_Y - 42)/6}$<br>*else*<br>*inputTensor[ 0 ][ yP + overlapSize ][ xP + overlapSize ][ 3 ] =* $2^{(SliceQp_Y - 42)/6}$<br>*}*<br>} |
| 3 | for( yP = −overlapSize; yP < inpPatchHeight + overlapSize; yP++)<br>for( xP = −overlapSize; xP < inpPatch Width + overlapSize; xP++ ) {<br>yTL = cTop + yP * 2<br>xTL = cLeft + xP * 2<br>yBR = yTL + 1<br>xBR = xTL + 1<br>yC = cTop / 2 + yP<br>xC = cLeft / 2 + xP<br>inpTLVal = InpY( InpSample Val( yTL, xTL, InpPicHeightInLumaSamples, InpPicWidthtInLumaSamples, CroppedYPic ) )<br>inpTRVal = InpY( InpSample Val( yTL, xBR, InpPicHeightInLumaSamples, InpPicWidthtInLumaSamples, CroppedYPic ) )<br>inpBLVal = InpY( InpSample Val( yBR, xTL, InpPicHeightInLumaSamples, InpPicWidthtInLumaSamples, CroppedYPic ) )<br>inpBRVal = InpY( InpSample Val( yBR, xBR, InpPicHeightInLumaSamples, InpPicWidthtInLumaSamples, CroppedYPic ) )<br>inpCbVal = InpC( InpSample Val( yC, xC, InpPicHeightInLumaSamples / 2, InpPicWidthtInLumaSamples / 2, CroppedCbPic ) )<br>inpCrVal = InpC( InpSampleVal( yC, xC, InpPicHeightInLumaSamples / 2, InpPicWidthtInLumaSamples / 2, CroppedCrPic ) )<br>if( nnpfc_component_last_flag = = 0 ) {<br>inputTensor[ 0 ][ 0 ][ yP + overlapSize ][ xP + overlapSize ] = inpTLVal<br>inputTensor[ 0 ][ 1 ][ yP + overlapSize ][ xP + overlapSize ] = inpTRVal<br>inputTensor[ 0 ][ 2 ][ yP + overlapSize ][ xP + overlapSize ] = inpBLVal<br>inputTensor[ 0 ][ 3 ][ yP + overlapSize ][ xP + overlapSize ] = inpBRVal<br>inputTensor[ 0 ][ 4 ][ yP + overlapSize ][ xP + overlapSize ] = inpCbVal<br>inputTensor[ 0 ][ 5 ][ yP + overlapSize ][ xP + overlapSize ] = inpCrVal<br>} else {<br>inputTensor[ 0 ][ yP + overlapSize ][ xP + overlapSize ][ 0 ] = inpTLVal<br>inputTensor[ 0 ][ yP + overlapSize ][ xP + overlapSize ][ 1 ] = inpTRVal<br>inputTensor[ 0 ][ yP + overlapSize ][ xP + overlapSize ][ 2 ] = inpBLVal<br>inputTensor[ 0 ][ yP + overlapSize ][ xP + overlapSize ][ 3 ] = inpBRVal<br>inputTensor[ 0 ][ yP + overlapSize ][ xP + overlapSize ][ 4 ] = inpCbVal<br>inputTensor[ 0 ][ yP + overlapSize ][ xP + overlapSize ][ 5 ] = inpCrVal<br>}<br>*if(nnpfc_auxiliary_input_idc = = 1) {*<br>if( nnpfc_component_last_flag = = 0 )<br>inputTensor[ 0 ][ 6 ][ yP + overlapSize ][ xP + overlapSize ] = $2^{(SliceQP_Y - 42)/6}$<br>else<br>inputTensor[ 0 ][ yP + overlapSize ][ xP + overlapSize ][ 6 ] = $22^{(SliceQP_Y - 42)/6}$<br>*}*<br>} |
| 4 . . . 255 | reserved |

Neural-Network Post-Filter Activation (NNPFA) SEI Message

In Ref. [21], the picture-layer NNPF message is denoted as the NNPFA SEI message. Proposed amendments to the existing syntax are denoted in Table 24 in Calibri.

Neural-Network Post-Filter Activation SEI Message Syntax

TABLE 24

Proposed amendments to NNPFA SEI messaging in Ref. [21]

| | Descriptor |
|---|---|
| nn_post_filter_activation( payloadSize ) { | |
| nnpfa_id | ue(v) |
| ***nnpfa_independent_flag*** | *u(1)* |
| *if( !nnpfa_independent_flag ) {* | |
| ***nnpfa_num_preceding_nnpfa_ids_minus1*** | *ue(v)* |
| *for ( i = 0; i <= nnpfa_num_preceding_nnpfa_ids_minus1; i++ )* | |
| ***nnpfa_preceding_nnpfa_id[ i ]*** | *ue(v)* |
| *}* | |
| } | |

Neural-Network Post-Filter Activation SEI Message Semantics

This SEI message specifies the neural-network post-processing filter that may be used for post-processing filtering for the current picture and conveys information on dependencies, if any, on other neural-network post-filters that may be present for the current picture.

The neural-network post-processing filter activation SEI message persists only for the current picture.

NOTE—There may be several neural-network post-processing filter activation SEI messages present for the same picture, for example, when the post-processing filters are meant for different purposes or filter different colour components.

nnpfa_id specifies that the neural-network post-processing filter specified by one or more neural-network post-processing filter characteristics SEI messages that pertain to the current picture and have nnpfc_id equal to nnfpa_id may be used for post-processing filtering for the current picture.

nnpfa_independent_flag equal to 0 indicates preference that input to the neural-network post-processing filter with nnfpa_id should depend on the output of one or more other neural-network post-processing filters that pertain to the current picture and have nnpfc_id not equal to nnpfa_id. nnpfa_independent_flag equal to 1 indicates no preference. When only one neural-network post-filter activation SEI message is present for the current picture, the value of nnpfa_independent_flag should be equal to 1.

nnpfa_num_preceding_nnpfa_ids_minus1 plus 1 specifies the number of neural-network post-processing filters that pertain to the current picture that should precede, in processing order, the neural-network post-processing filter specified by nnpfa_id.

nnpfa_preceding_nnpfa_id[i] specifies that the neural-network post-processing filter specified by nnpfc_id equal to nnpfa_preceding_nnpfa_id[i] should precede, in processing order, the neural-network post-processing filter specified by nnpfa_id.

Figure 5:
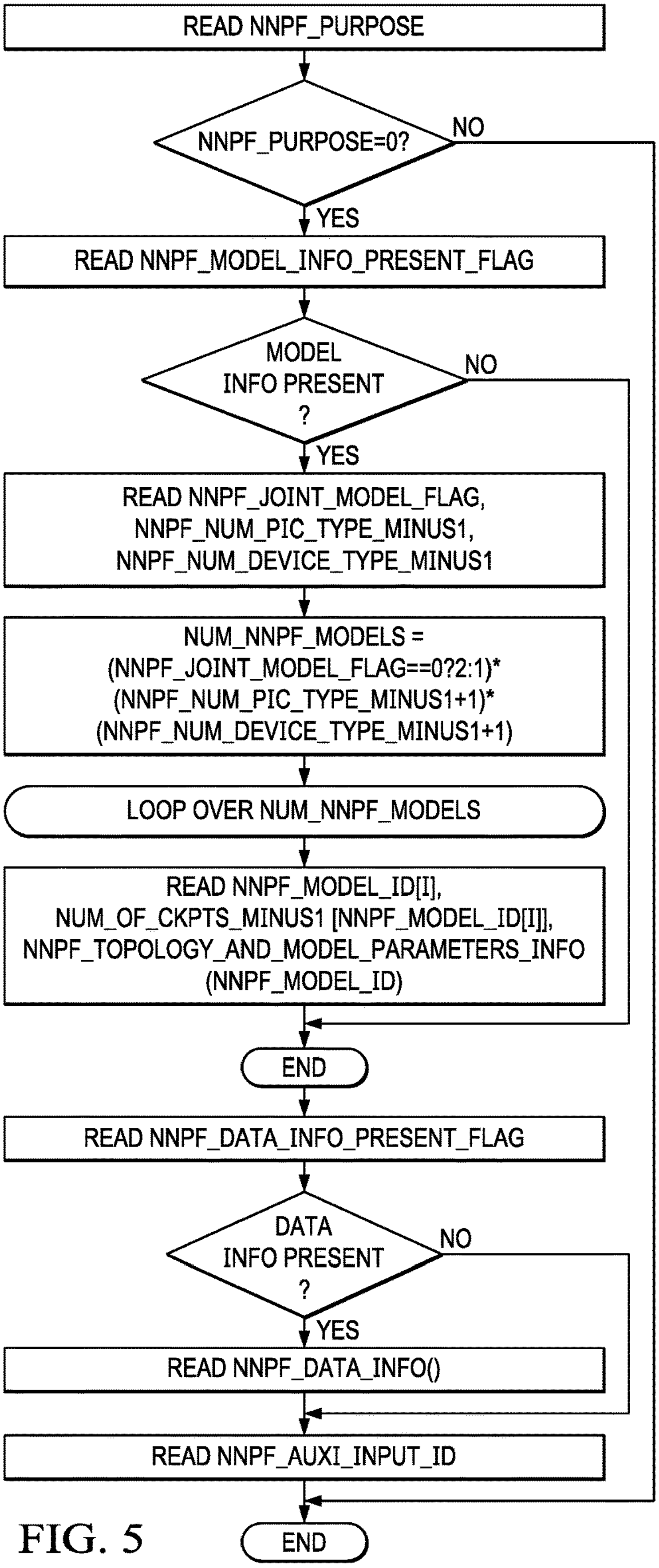
FIG. 5 depicts an example process for processing an SEI message for NNPF processing at the coded-sequence layer according to an embodiment of this invention.
Figure 6A:
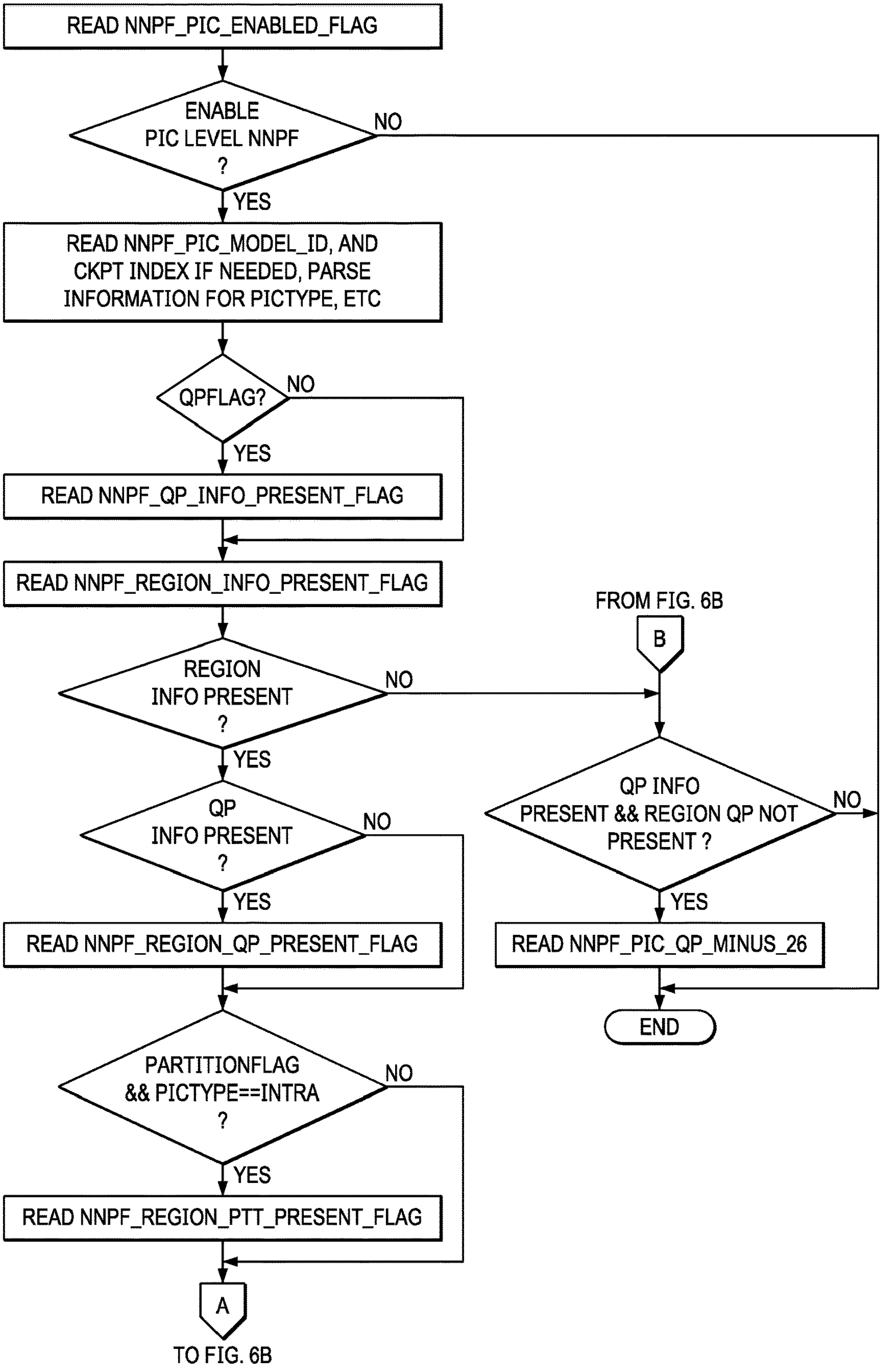
FIG. 6 depicts an example process for processing an SEI message for NNPF processing at the picture layer according to an embodiment of this invention.
Figure 6B:
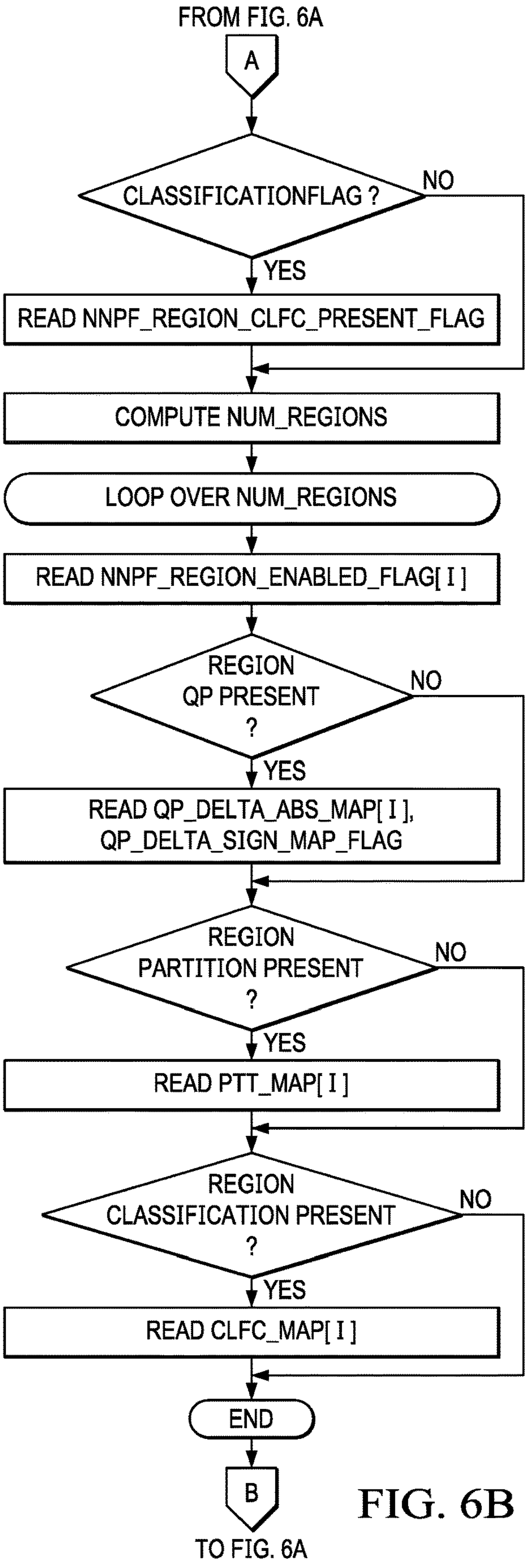

FIG. 5 depicts an example of the data flow for processing CLVS-layer NNPF SEI messaging. The data flow follows the syntax of Table 11. For the picture layer NNPF SEI message depicted in Table 16, an example of the corresponding data flow processing is depicted in FIG. 6.

As discussed in Ref. [19], in certain applications it may be necessary to define the priority order of how multiple SEI messages may be executed. As examples, priority is important when considering SEI messages for FGC (Film Grain Characteristics) and CTI (Colour Transform Information). In HEVC and AVC, post-filter hint, tone mapping information, and chroma resampling filter hint SEI messages are additional examples of SEI messages that need to be considered for defining their processing order. The processing order of NNPF SEI messaging should be also considered. The specific order needs to be decided by the user case and can be transmitted as suggested in the proposed processing-order SEI (Ref. [19]) along with the bitstream. As an example, suppose the bitstream carries SDR (standard dynamic range) video and FGC, CTI, and NNPF SEI messaging, where CTI SEI is used to convert SDR video to HDR video, and NNPF SEI is used for quality improvement on the SDR decoded video. In an embodiment, the proposed order may be: first, NNPF SEI (to improve the decoded video quality), next, CTI SEI (to convert SDR to HDR), and finally FGC SEI (to add the film grain effect for the final display). For example, if applied earlier, added film grain noise may be amplified during the SDR to HDR conversion.

References

Each one of the references listed herein is incorporated by reference in its entirety. The term JVET refers to the Joint Video Experts Team of ITU-T SG 16 WP 3 and ISO/IEC JTC 1/SC 29.

[1] Advanced Video Coding, Rec. ITU-T H.264, May 2019.

[2] High Efficiency Video Coding, Rec. ITU-T H.265, November 2019.

[3] Versatile Video Coding, Rec. ITU-T H.266, August 2020.

[4] M. M. Hannuksela, M. Santamaria, F. Cricri, E. B. Aksu, H. R. Tavakoli, "AHG9: On post-filter SEI," JVET-Y0115, online meeting, January 2022

[5] M. M. Hannuksela, E. B. Aksu, F. Cricri, H. R. Tavakoli, M. Santamaria, "AHG9: On post-filter SEI," JVET-X0112, online meeting, October 2021.

[6] M. M. Hannuksela, E. B. Aksu, F. Cricri, H. R. Tavakoli, "AHG9: On post-filter SEI", JVET-V0058, online meeting, April 2021.

[7] T. Chujoh, Y. Yasugi, K. Takada, T. Ikai, "AHG9: Colour component description for post-filter purpose SEI message," JVET-Y0073, online meeting, January 2022

[8] Y. Yasugi, T. Chujoh, K. Takada, T. Ikai, "AHG9: Data conversion description for NNR post-filter SEI message," JVET-Y0074, online meeting, January 2022.

[9] K. Takada, Y. Yasugi, T. Chujoh, T. Ikai, "AHG9: Complexity description for NNR post-filter SEI message," JVET-Y0075, online meeting, January 2022

[11] B. Choi, Z. Li, W. Wang, W. Jiang, X. Xu, S. Wenger, S. Liu, "AHG9/AHG11: SEI messages for carriage of neural network information for post-filtering," JVET-V0091, online meeting, April 2021.

[12] MPEG-7: Compression of Neural Networks for Multimedia Content Description and analysis: ISO/IEC 15938-17.

[13] "White Paper on Neural Network Coding," MPEG document N00057, ISO/IEC JTC 1/SC 29/WG 04, January 2022.

[14] H. Kirchhoffer et al., "Overview of the Neural Network Compression and Representation (NNR) Standard," in IEEE Transactions on Circuits and Systems for Video Technology, doi: 10.1109/TCSVT.2021.3095970.

[15] Maria Santamaria, Jani Lainema, Francesco Cricri, Ramin G. Youvalari, Honglei Zhang, Alireza Zare, Goutham Rangu, Hamed R. Tavakoli, Homayun Afrabandpey, Miska Hannuksela, "AHG11: MPEG NNR compressed bias update for the CNN based post-filter of EE1-1.1", JVET-X0111, October 2021.

[15] Y. Li, K. Zhang, L. Zhang, H. Wang, J. Chen, K. Reuze, A. M. Kotra, M. Karczewicz, "EE1-1.6: Combined Test of EE1-1.2 and EE1-1.4," JVET-X0066, online meeting, October 2021.

[16] H. Wang, J. Chen, K. Reuze, A. M. Kotra, M. Karczewicz, "EE1-1.4: Tests on Neural Network-based In-Loop Filter with constrained computational complexity," JVET-X0140, online meeting, October 2021.

[17] Y. Li, K. Zhang, L. Zhang, "AHG11: Deep In-Loop Filter with Adaptive Model Selection and External Attention," JVET-W0100, online meeting, July 2021.

[18] L. Wang, X. Xu, S. Liu, "EE1-1.1: neural network based in-loop filter with constrained storage and low complexity," JVET-Y0078, online meeting, January 2022.

[19] P. Yin et al., "Signaling of priority processing order for metadata messaging in video coding," U.S. Provisional Patent Application, Ser. No. 63/216,318, filed on Jun. 29, 2021.

[20] M. M. Hannuksela et al., "AHG9: NN post-filter SEI," JVET-Z0244, online meeting, 20-29 Apr. 2022.

[21] S. McCarthy et al., "Additional SEI messages for VSEI (Draft 1)," JVET-Z2006, output document of April 2022 online meeting, June 2022.

[22] S. McCarthy et al., "AHG9: Neural-network post filtering SEI message," JVET-Z0121, online meeting, 20-29 Apr. 2022.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the carriage of neural network topology and parameters as related to NNPF in image and video coding, such as those described herein. The computer and/or IC may compute any of a variety of parameters or values that relate to the carriage of neural network topology and parameters as related to NNPF in image and video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to the carriage of neural network topology and parameters as related to NNPF in image and video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the carriage of neural network topology and parameters as related to NNPF in image and video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to process with neural-networks post filtering (NNPF) one or more pictures in a coded video sequence, the method comprising:

receiving a decoded image and NNPF metadata related to processing the decoded image with NNPF;

parsing syntax parameters in the NNPF metadata to perform NNPF according to one or more neural-network models, associated NNPF data, and NNPF parameters; and performing NNPF on the decoded image according to the syntax parameters to generate an output image, wherein the syntax parameters in the NNPF metadata comprise a first set of NNPF messaging parameters that persist until the end of decoding the coded video sequence and a second set of NNPF messaging parameters that persist until the end of NN post-filtering of the decoded image, wherein the first set of NNPF messaging parameters include a flag indicating that a distinct combination of color primaries, transfer characteristics, and matrix coefficients for the NNPF metadata are present.

2. The method of claim 1, wherein the first set of NNPF messaging parameters comprise one or more of:

an NNPF model information is present flag, indicating NNPF model information is present in the NNPF metadata;

an NNPF joint model flag (nnpf_joint_model_flag) indicating whether NNPF applies or not identical neural network models for both luma and chroma components;

an NNPF number of picture types parameter (nnpf_num_pic_type_minus1) indicating a number of different picture types being supported by NNPF;

an array of NNPF model IDs (nnpf_model_id[i]) to identify each NNPF model;

first parameters related to neural networks topology and model information; second parameters related to data information in the decoded image; and third parameters related to NNPF auxiliary information.

3. The method of claim 2, wherein the first parameters related to neural networks topology and model information comprise one or more of:

a flag indicating whether detailed information for a NN model used in NNPF is provided using an external link;

an NNPF storage and exchange data format parameter;

an NNPF arithmetic precision parameter;

an NNPF number of models parameter; and an NNPF latency estimate parameter.

4. The method of claim 2, wherein the second parameters related to data information in the decoded image comprises one or more of:

an input chroma format parameter;

a packing format parameter;

a chroma-dependency format parameter;

an input tensor format parameter;

a picture padding parameter; and a temporal picture flag indicating the presence of temporal neighbor pictures as an auxiliary input.

5. The method of claim 4, wherein the picture padding parameter comprises:

0, for zero padding;

1, for replication padding; and 2, for reflection padding.

6. The method of claim 4, wherein the second parameters related to data information further comprise:

a flag indicating whether auxiliary input data is present in the input tensor format parameter of the NNPF metadata.

7. The method of claim 2, wherein the third parameters related to NNPF auxiliary information comprise an NNPF auxiliary input identifier which indicates availability of auxiliary inputs comprising one or more of:

a QP map;

a partition map; and a classification map.

8. The method of claim 1, wherein the second set of NNPF messaging parameters comprise an NNPF picture model ID specifying a NN post filter to be used for the decoded image.

9. The method of claim 8, wherein the second set of NNPF messaging parameters further comprise one or more of:

picture QP related metadata;

picture partition related metadata;

picture classification related metadata;

a dependency flag indicating whether signaled NN post-filtering is independent or dependent on other NN post filters, and if the dependency flag indicates dependency on other NN post filters, then further comprising:

a preceding number variable indicating how many NN post filters should precede in processing order a current NNPF specified by a picture-layer NNPF identity variable;

an array of NNPF identity variables of NN post-filters which should precede in processing order the current NNPF.

10. The method of claim 9, wherein the picture QP related metadata comprise one or more of:

an NNPF QP info present flag indicating the presence of QP information;

an NNPF region info flag indicating the presence of region information;

an NNPF region QP present flag indicating the presence of region-based QP information; and if the NNPF QP info present flag is set, further comprising QP information for at least one region.

11. The method of claim 9, wherein the picture partition related metadata comprise:

an NNPF region partition present flag indicating the presence of NNPF region partition information; and if the NNPF region partition present flag is set, further comprising at least one picture partition map.

12. The method of claim 9, wherein the picture classification related metadata comprise one or more of:

an NNPF picture classification present flag indicating the presence of picture classification information; and if the NNPF picture classification present flag is set, further comprising picture classification for at least one region.

13. A method to encode with a processor an image or a coded video sequence, the method comprising:

receiving an image or a video sequence comprising pictures;

encoding the image or the video sequence into a coded bitstream;

generating neural networks post filtering (NNPF) metadata to allow a decoder of the coded bitstream to perform NNPF according to one or more neural-network models, associated NNPF data, and NNPF parameters; and generating an output comprising the coded bitstream and the NNPF metadata, wherein syntax parameters in the NNPF metadata comprise a first set of NNPF messaging parameters that persist until the end of decoding the coded video sequence and a second set of NNPF messaging parameters that persist until the end of NN post-filtering of a single decoded image, wherein the first set of NNPF messaging parameters include a flag indicating that a distinct combination of color primaries, transfer characteristics, and matrix coefficients for the NNPF metadata are present.

14. A non-transitory computer-readable storage medium having stored thereon computer-executable instructions for executing with one or more processors a method in accordance with claim 1.

15. An apparatus comprising a processor and configured to perform the method recited in claim 1.

16. A non-transitory computer-readable storage medium having stored thereon computer-executable instructions for executing with one or more processors a method in accordance with claim 13.

17. An apparatus comprising a processor and configured to perform the method recited in claim 13.

* * * * *